US010936599B2

(12) United States Patent
Murray et al.

(10) Patent No.: US 10,936,599 B2
(45) Date of Patent: Mar. 2, 2021

(54) ADAPTIVE RECOMMENDATIONS

(71) Applicant: Oracle International Corporation, Redwood Shores, CA (US)

(72) Inventors: Glenn Allen Murray, Boulder, CO (US); Luis E Rivas, Denver, CO (US); Mark L. Kreider, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 16/141,356

(22) Filed: Sep. 25, 2018

(65) Prior Publication Data
US 2019/0102438 A1 Apr. 4, 2019

Related U.S. Application Data

(60) Provisional application No. 62/566,139, filed on Sep. 29, 2017.

(51) Int. Cl.
*G06F 16/00* (2019.01)
*G06F 16/2457* (2019.01)
*G06F 16/22* (2019.01)
*G06F 16/907* (2019.01)
*G06F 40/16* (2020.01)
*G06F 40/18* (2020.01)
*G06F 40/109* (2020.01)
*G06F 40/216* (2020.01)

(52) U.S. Cl.
CPC ...... *G06F 16/24573* (2019.01); *G06F 16/221* (2019.01); *G06F 16/907* (2019.01); *G06F 40/109* (2020.01); *G06F 40/16* (2020.01); *G06F 40/18* (2020.01); *G06F 40/216* (2020.01)

(58) Field of Classification Search
None
See application file for complete search history.

(56) References Cited

U.S. PATENT DOCUMENTS 5,511,190 A 4/1996 Sharma et al.
6,047,283 A 4/2000 Braun
(Continued)

FOREIGN PATENT DOCUMENTS

CN 102792298 11/2012
CN 106687952 5/2017
(Continued)

OTHER PUBLICATIONS

Apache Tika—a Content Analysis Toolkit, The ApacheSoftware Foundation, Available Online at http://tika.apache.org/, Dec. 23, 2015, 9 pages.
(Continued)

*Primary Examiner* — Bai D Vu
(74) *Attorney, Agent, or Firm* — Kilpatrick Townsend & Stockton LLP

(57) ABSTRACT

Techniques are disclosed for providing adaptive recommendations for a data set. A data set can include one or more columns of data. The data set can be profiled in order to identify actions that can be applied to the data in order to enrich the data. The data set and actions that were applied to the data set can be stored. Actions that are applied to subsequent data sets can take into account the actions that were applied to prior data sets having similar profiles.

19 Claims, 18 Drawing Sheets

(56) References Cited

U.S. PATENT DOCUMENTS

| | | |
|---|---|---|
| 6,556,983 B1 | 4/2003 | Altschuler et al. |
| 6,807,558 B1 | 10/2004 | Hassett et al. |
| 6,839,724 B2 | 1/2005 | Manchanda et al. |
| 7,571,177 B2 | 8/2009 | Damle |
| 8,082,233 B2 | 12/2011 | Bhandari |
| 8,155,951 B2 | 4/2012 | Jamieson |
| 8,234,285 B1 | 7/2012 | Cohen |
| 8,458,191 B2 | 6/2013 | Bhattacharjee et al. |
| 8,874,616 B1 | 10/2014 | Coffman et al. |
| 9,244,956 B2 | 1/2016 | Bice et al. |
| 9,727,723 B1 * | 8/2017 | Kondaveeti ............. G06F 21/50 |
| 9,792,351 B2 | 10/2017 | Hernandez-Sherrington et al. |
| 10,210,246 B2 | 2/2019 | Stojanovic et al. |
| 10,445,062 B2 | 10/2019 | Oberbreckling et al. |
| 2002/0107861 A1 | 8/2002 | Clendinning et al. |
| 2002/0152201 A1 | 10/2002 | Nanavati et al. |
| 2004/0260695 A1 | 12/2004 | Brill |
| 2005/0071140 A1 | 3/2005 | Ben-hur et al. |
| 2005/0278307 A1 | 12/2005 | Battagin et al. |
| 2006/0075021 A1 | 4/2006 | Sugiyama et al. |
| 2006/0282429 A1 | 12/2006 | Hernandez-Sherrington et al. |
| 2007/0112827 A1 | 5/2007 | Dettinger et al. |
| 2008/0027929 A1 | 1/2008 | Rice et al. |
| 2008/0281820 A1 | 11/2008 | Do et al. |
| 2009/0006460 A1 | 1/2009 | Kleinberg et al. |
| 2010/0131844 A1 | 5/2010 | Wohlert |
| 2010/0205475 A1 | 8/2010 | Ebrahimi et al. |
| 2010/0274821 A1 | 10/2010 | Bernstein et al. |
| 2011/0106791 A1 | 5/2011 | Maim |
| 2011/0173149 A1 | 7/2011 | Schon |
| 2011/0225167 A1 | 9/2011 | Bhattacharjee et al. |
| 2012/0101975 A1 | 4/2012 | Khosravy |
| 2012/0117076 A1 | 5/2012 | Austermann |
| 2012/0136859 A1 | 5/2012 | Shamsi et al. |
| 2012/0166180 A1 | 6/2012 | Au |
| 2013/0110792 A1 | 5/2013 | Hudis et al. |
| 2013/0232452 A1 | 9/2013 | Krajec et al. |
| 2014/0052688 A1 | 2/2014 | Bansal |
| 2014/0067728 A1 | 3/2014 | Ogren et al. |
| 2014/0074829 A1 | 3/2014 | Schmidt |
| 2014/0115155 A1 | 4/2014 | Bonchi et al. |
| 2014/0222181 A1 | 8/2014 | Hemenway et al. |
| 2014/0279865 A1 | 9/2014 | Kumar et al. |
| 2014/0337331 A1 | 11/2014 | Hassanzadeh et al. |
| 2015/0067556 A1 * | 3/2015 | Tibrewal ............. G06F 16/2465 715/765 |
| 2015/0106324 A1 | 4/2015 | Puri et al. |
| 2015/0242408 A1 | 8/2015 | Frohock et al. |
| 2015/0269161 A1 | 9/2015 | Bhagavan et al. |
| 2015/0324346 A1 | 11/2015 | Sankaran et al. |
| 2015/0370775 A1 | 12/2015 | Bauchot |
| 2016/0055221 A1 | 2/2016 | Paquette et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0092557 A1 | 3/2016 | Stojanovic et al. |
| 2016/0188701 A1 | 6/2016 | Fapohunda |
| 2016/0286544 A1 | 9/2016 | Ikeda et al. |
| 2016/0307210 A1 | 10/2016 | Agarwal et al. |
| 2016/0328406 A1 | 11/2016 | Convertino et al. |
| 2017/0060931 A1 * | 3/2017 | Puri ....................... G06N 20/00 |
| 2017/0132289 A1 | 5/2017 | Palaniappan et al. |
| 2017/0149924 A1 | 5/2017 | Peterson et al. |
| 2017/0308595 A1 | 10/2017 | Dey et al. |
| 2017/0364570 A1 | 12/2017 | Jacob et al. |
| 2017/0371949 A1 | 12/2017 | Le Biannic |
| 2018/0074786 A1 | 3/2018 | Oberbreckling et al. |
| 2018/0075104 A1 | 3/2018 | Oberbreckling et al. |
| 2018/0075115 A1 | 3/2018 | Murray et al. |

FOREIGN PATENT DOCUMENTS

| | | |
|---|---|---|
| CN | 106796595 | 5/2017 |
| EP | 3198482 | 8/2017 |
| EP | 3198484 | 8/2017 |
| JP | 2017534108 | 11/2017 |
| JP | 2017536601 | 12/2017 |
| JP | 6568935 | 8/2019 |
| WO | 2016049437 | 3/2016 |
| WO | 2016049460 | 3/2016 |
| WO | 2016209213 | 12/2016 |
| WO | 2016049437 | 3/2017 |

OTHER PUBLICATIONS

Commons Virtual File System, The Apache Software Foundation, Available Online at http://commons.apache.org/proper/commons-vfs/index.html, Feb. 28, 2014, 2 pages.

Gensim: Topic Modelling for Humans Xploiting Similarities Among Languages for Machine Translation, Available Online at https://radimrehurek.com/gensim/, Dec. 23, 2015, 2 pages.

Hadoop MapReduce Next Generation—Writing YARN Applications, Apache Hadoop 2.4.1—HadoopMap Reduce Next Generation—2.4.1, Jun. 21, 2014, 11 pages.

HDFS Permissions Guide, Available Online at http://hadoop.apache.org/docs/current/hadoop-project-dist/hadoop-hdfs/HdfsPermissionsGuide.html, Dec. 23, 2015, 6 pages.

Jaccard Index, Wikipedia, Available Online at https://en.wikipedia.org/wiki/Jaccard_index, Dec. 23, 2015, 5 pages.

K-Means Clustering, Wikipedia, Available Online at https://en.wikipedia.org/wiki/K-means_clustering, Dec. 23, 2015, 12 pages.

Launching Spark on YARN, Spark 0.9.0, Available Online at http://spark.apache.org/docs/0.9.0/running-on-yarn.html, Dec. 23, 2015, 4 pages.

Making Sense of Word2vec, RaRe Technologies, RaRe Machine Learning Blog, Available Online at http://rare-technologies.com/making-sense-of-word2vec/, Dec. 23, 2014, 16 pages.

MLlib—Feature Extraction and Transformation, Spark 1.5.2, Available Online at http://spark.apache.org/docs/latest/mllib-feature-extraction.html, Dec. 23, 2015, 9 pages.

Running Spark on YARN, Spark 1.5.2, Available Online at http://spark.apache.org/docs/latest/running-on-yarn.html, Dec. 23, 2015, 4 pages.

Securing the Hadoop Ecosystem, ATM (Cioudera) & Tucu (Cioudera), Hadoop Summit, Available Online at http://www.slideshare.net/Hadoop_Summit/abdelnur-myers-june261120room230av2, Jun. 2013, 27 pages.

Service Level Authorization Guide, Apache Hadoop 2.6.0-cdh5.5.1, Available Online at http://archive.cloudera.com/cdh5/cdh/5/hadoop/hadoop-project-dist/hadoop-common/ServiceLevelAuth.html, Dec. 23, 2015, 3 pages.

Sorensen—Dice Coefficient, Wikipedia, Available Online at https://en.wikipedia.org/wiki/S%C3%B8rensen%E2%80%93Dice_coefficient, Dec. 23, 2015, 4 pages.

Sqoop User Guide (v1.4.2), Available Online at http://sqoop.apache.org/docs/1.4.2/SqoopUserGuide.html, Dec. 23, 2015, 37 pages.

Suffix Tree, Wikipedia, Available Online at http://en.wikipedia.org/wiki/Suffix_tree, Dec. 23, 2015, 7 pages.

Supported File Systems, Commons VFS, Version: 2.1-Snapshot, Available Online at http://commons.apache.org/proper/commons-vfs/filesystems.html, Feb. 28, 2014, 6 pages.

Trie, Wikipedia, Available Online at http://en.wikipedia.org/wiki/Trie, Dec. 23, 2015, 8 pages.

Tversky index, Wikipedia, Available Online at https://en.wikipedia.org/wiki/Tversky_index, Dec. 23, 2015, 2 pages.

Welcome to Apache Flume, Available Online at http://flume.apache.org/, Dec. 23, 2015, 7 pages.

Yago: A High-Quality Knowledge Base, Databases and Information Systems, Available Online at http://www.mpi-inf.mpg.de/departments/databases-and-information-systems/research/yago-naga/yago//, Dec. 23, 2015, 4 pages.

U.S. Appl. No. 14/864,485, Final Office Action dated May 16, 2018, 22 pages.

(56) References Cited

OTHER PUBLICATIONS

U.S. Appl. No. 14/864,485, Non-Final Office Action dated Oct. 2, 2017, 25 pages.
U.S. Appl. No. 14/864,496, Final Office Action dated Jul. 3, 2018, 24 pages.
U.S. Appl. No. 14/864,496, Non-Final Office Action dated Nov. 2, 2017, 20 pages.
U.S. Appl. No. 14/864,505, Final Office Action dated Jul. 31, 2018, 22 pages.
U.S. Appl. No. 14/864,505, Non-Final Office Action dated Mar. 7, 2018, 17 pages.
U.S. Appl. No. 14/864,513, Final Office Action dated Sep. 5, 2018, 28 pages.
U.S. Appl. No. 14/864,513, Non-Final Office Action dated Dec. 14, 2017, 27 pages.
U.S. Appl. No. 14/864,520, Final Office Action dated Jul. 20, 2018, 28 pages.
U.S. Appl. No. 14/864,520, Non-Final Office Action dated Nov. 16, 2017, 23 pages.
Angell et al., Automatic Spelling Correction Using Trigram Similarity Measure, Information Processing & Management, vol. 19, No. 4, 1983, pp. 255-261.
Boruvka, On a Certain Minimal Problem, Faculty of Moravian, vol. III, Publication 3, 1926, pp. 37-58.
Buscaldi et al., LIPN-CORE: Semantic Text Similarity using n-grams, WordNet, Syntactic Analysis, ESA and Information Retrieval based Features, Second Joint Conference on Lexical and Computational Semantics Proceedings of the Main Conference and the Shared Task, Jun. 13, 2013, pp. 162-168.
Dave, IndexedRDD: Efficeint Fine-Grained Updates for RDD's, UC Berkeley AMPLab, Available Online at http://www.slideshare.net/SparkSummit/ankur-dave, Jun. 15, 2015, 26 pages.
Edmonds, Choosing the Word Most Typical in Context: Using a Lexical Co-occurrence Network, In Proceedings of the 35th Annual Meeting of the Association for Computational Linguistics, Available Online at https://arxiv.org/pdf/cs/9811009.pdf, Jul. 1997, pp. 507-509.
European Application No. 15781210.8, Office Action dated Feb. 28, 2018, 6 pages.
European Application No. 15781210.8, Summons to Attend Oral Proceedings mailed on Jun. 19, 2018, 10 pages.
European Application No. 15781486.4, Office Action dated Jun. 6, 2018, 7 pages.
Florek et al., On Liaison and Points Dividing a Finite Set, Colloquium Mathematics, vol. 2, Issue 3-4, 1951, pp. 282-285.
Fu et al., Learning Semantic Hierarchies via Word Embeddings, Proceedings of the 52nd Annual Meeting of the Association for Computational Linguistics, Available Online at: http://ir.hit.edu.cn/~rjfu/publications/acl2014.pdf, Jun. 23-25, 2014, pp. 1199-1209.
Homma et al., An Artificial Neural Network for Spatiotemporal Bipolar patterns: Application to Phoneme Classification, Proceeding NIPS'87 Proceedings of the 1987 International Conference on Neural Information Processing Systems, 1988, pp. 31-40.
Islam et al., Text Similarity Using Google Tri-grams, Proceeding Canadian Al'12 Proceedings of the 25th Canadian conference on Advances in Artificial Intelligence, May 28, 2012, pp. 312-317.
Jaccard, The Distribution of the Flora in the Alpine Zone, New Phytoiiogist, vol. 11, No. 2, Available Online at http://www.researchgate.net/profile/Paul_Jaccard/publication/230302439_The_distribution_of_the_flora_in_the_alpine_zone/links/02e7e51cb76619a0fa000000.pdf, Feb. 1912, 15 pages.
Kalchbrenner et al., A Convolutional Neural Network for Modelling Sentences, Proceedings of the 52nd Annual Meeting of the Association for Computational Linguistics, Available Online at https://arxiv.org/abs/1404.2188, Apr. 8, 2014, 11 pages.

Malak, 17 Qualities of the Ideal Recommender System, Available Online at http://datascienceassn.org/content/17-qualities-ideal-recommender-system, Aug. 9, 2014, 3 pages.
Malak, Extending Word2Vec for Performance and Semi-Supervised Learning, Oracle, Available Online at http://spark-summit.org/2015/talk/extending-word2vec-for-performance-and-semi-supervised-learning, Jun. 15, 2015, 39 pages.
Markines et al., Evaluating Similarity Measures for Emergent Semantics of Social Tagging, International World Wide Web Conference 18th, Apr. 24, 2009, pp. 641-650.
Mikolov et al., Exploiting Similarities Among Languages for Machine Translation, Available Online at http://arxiv.org/pdf/1309.4168.pdf, Sep. 17, 2013, 10 pages.
Milo et al., REACT: Context Sensitive Recommendations for Data Analysis, SIGMOD'16, Available Online at http://www.cs.tau.ac.il/~milo/projects/modas/papers/sigmod16b.pdf, Jun. 26-Jul. 1, 2016, pp. 2137-2140.
Ouyang et al., Sentiment Analysis Using Convolutional Neural Network, IEEE International Conference on Computer and Information Technology; Ubiquitous Computing and Communications; Dependable, Autonomic and Secure Computing; Pervasive Intelligence and Computing, Oct. 26-28, 2015, pp. 2359-2364.
International Application No. PCT/US2015/052190, International Preliminary Report on Patentability dated Apr. 6, 2017, 18 pages.
International Application No. PCT/US2015/052190, International Search Report and Written Opinion dated Dec. 9, 2015, 20 pages.
International Application No. PCT/US2015/052228, International Preliminary Report on Patentability dated Apr. 6, 2017, 8 pages.
International Application No. PCT/US2015/052228, International Search Report and Written Opinion dated Nov. 18, 2015, 11 pages.
Ricci, Part 15: Knowledge-Based Recommender Systems, Available Online at http://www.ics.uci.edu/~welling/teaching/CS77Bwinter12/presentations/course_Ricci/15-KnowledgeBased.pdf, Dec. 23, 2015, 58 pages.
Sanborn et al., A Bigram Extension to Word Vector Representation, Available Online at http://cs229.stanford.edu/proj2014/Adrian%20Sanborn,%20Jacek%20Skryzalin,%20A%20bigram%20extension%20to%20word%20vector%20representation.pdf, 2015, 5 pages.
Sedding et al., WordNet-Based Text Document Clustering, Proceedings of the 3rd Workshop on Robust Methods in Analysis of Natural Language Data, Romano '04, Jan. 1, 2004, pp. 104-113.
Smetanin, Fuzzy String Search, Nikita's Blog, Search Algorithms, Software Development and so on, Available Online at http://ntz-develop.blogspot.com/2011/03/fuzzy-string-search.html, Mar. 24, 2011, 13 pages.
Suchanek et al., YAGO: A Core of Semantic Knowledge Unifying WordNet and Wikipedia, Proceeding WWW '07 Proceedings of the 16th International Conference on World Wide Web, Session: Ontologies Available Online at http://www2007.org/papers/paper391.pdf, May 2007, pp. 697-706.
Yang et al., Learning Multi-Relational Semantics Using Neural-Embedding Models, Cornell University Library, Available Online at http://arxiv.org/abs/1411.4072, Nov. 14, 2014, 5 pages.
U.S. Appl. No. 14/864,485, Notice of Allowance dated Sep. 24, 2018, 7 pages.
Halevy et al., Goods: Organizing Google's Datasets, SIGMOD/PODS, Jun. 26, 2016-Jul. 1, 2016, pp. 795-806.
Chinese Application No. 201580047579.X, Office Action dated Apr. 21, 2020, 20 pages (9 pages of Original Document and 11 pages of English Translation).
Zhou, Similarity Systems Engineering, Systems Engineering, Theory & Practice, vol. 17, Issue 9, Dec. 25, 1997: 37-43, English Translation of Office Action attached to explain relevance. (14 pages).
Chinese Application No. CN201580047579.X, Office Action dated Dec. 29, 2020, 23 pages (9 pages of Original Document and 14 pages of English Translation).

* cited by examiner

Example profile fragment in plain text:

vocabulary size: 11
base type: text
type: text, subtype: label, distribution: key
label name: State
known heading: State
imputed name: us_state_postal_abbrev_0003
requires: KG
matching domains:
    us_state_postal_abbrev10   (recognition: 90.91%)  values: 10   size: 52
(selectivity: 58.27%)  [confidence: 52.98%] *
    country6  (recognition: 54.55%)  values: 6  size: 756  (selectivity: 27.03%)  [confidence: 14.75%]
    name_last   3   (recognition: 27.27%)  values: 3  size: 50090
(selectivity: 10.15%)  [confidence: 2.77%]
    name_first   2   (recognition: 18.18%)  values: 2  size: 5214
(selectivity: 8.10%)  [confidence: 1.47%]
    name_title   1   (recognition: 9.09%)  values: 1  size: 141
(selectivity: 0.0%)  [confidence: 0.0%]
matching domain: us_state_postal_abbrev
DB style coarse type: string
category: us_state_postal_abbrev
rationale: noisy_text_label knowledge
contributing mass: 10 (90.91%)

Example action:

```
"actions": [
  {
    "CLASS": "oracle.imi.jxfe.action.JxfeRenameColumnAction",
    "INSTANCE": {
      "newColumnName": "us_phone",
      "columnId": 15,
      "id": 3,
      "index": -1,
      "source": "DEFAULT_SOURCE_NAME",
      "description": "Rename this column to the suggested name \"us_phone\".",
      "autoAccept": true
    }
  },
]
```

FIG. 3

```
DEBUG HistoryRxSpec: 95 - similarDocNames for BOW-4b: BOW-3a, BOW-0a, BOW-4a, BOW-1a
DEBUG HistoryRxSpec: 98 - similarDocRels: BOW-3a, BOW-0a, BOW-4a, BOW-1a
DEBUG HistoryRxSpec:106 - similarColumns for
email_0014:
    (BOW-3a,List(email_0013)), (BOW-0a,List(email_0013)), (BOW-4a,List(email_0013)), (BOW-
1a,List(email_0013)),
name_first_0023:
    (BOW-3a,List(name_first_0004)), (BOW-0a,List(name_first_0004)), (BOW-4a,List(name_first_0004)), (BOW-
1a,List(name_first_0004)),
gender_0025:
    (BOW-3a,List(gender_0002)), (BOW-0a,List(gender_0002)), (BOW-4a,List(gender_0002)), (BOW-
1a,List(gender_0002))
DEBUG HistoryRxSpec:112 - xfeScripts
(BOW-3a,List(CaseUpdateAction, CaseUpdateAction, CaseUpdateAction, RegexReplaceAction, ExtractRegexAction))
(BOW-0a,List(CaseUpdateAction, CaseUpdateAction, CaseUpdateAction, RegexReplaceAction))
(BOW-4a,List(CaseUpdateAction, CaseUpdateAction, CaseUpdateAction, RegexReplaceAction, ExtractRegexAction))
(BOW-1a,List(CaseUpdateAction, CaseUpdateAction, CaseUpdateAction, RegexReplaceAction))
DEBUG HistoryRxSpec:125 - Actions on columns similar to
email_0014:
    (BOW-3a,List(ExtractRegexAction))
    (BOW-0a,List())
    (BOW-4a,List(ExtractRegexAction))
    (BOW-1a,List()),
name_first_0023:
    (BOW-3a,List(CaseUpdateAction))
    (BOW-0a,List())
    (BOW-4a,List(CaseUpdateAction))
    (BOW-1a,List(CaseUpdateAction)),
gender_0025:
    (BOW-3a,List(CaseUpdateAction))
    (BOW-0a,List(CaseUpdateAction))
    (BOW-4a,List(CaseUpdateAction))
    (BOW-1a,List(CaseUpdateAction))
```

```
DEBUG HistoryRxSpec:131 - equivClassRepsList:
    email_0014:
        ExtractRegexAction
    name_first_0023:
        CaseUpdateAction
    gender_0025:
        CaseUpdateAction
DEBUG HistoryRxSpec:155 - actionHistsList:
    email_0014:
        ExtractRegexAction: List(1, 0, 1, 0)
    name_first_0023
        CaseUpdateAction: List(1, 0, 1, 1)      } 420
    gender_0025
        CaseUpdateAction: List(1, 1, 1, 1)
DEBUG HistoryRxSpec:161 - actionScoresList:
    email_0014
        ExtractRegexAction:  0.4
    name_first_0023
        CaseUpdateAction:    0.8                } 430
    gender_0025
        CaseUpdateAction:    1.0
DEBUG HistoryRxSpec:180 - Generated 3 rxs using rxThreshold 0.2 for these columns:
    email_0014                          HistoryRx to REMOVE_ALL_MATCHES for text matching .*@
        ExtractRegexActionDto:
    name_first_0023                     HistoryRx to change case to UPPER.
        CaseUpdateActionDto:
    gender_0025                         HistoryRx to change case to UPPER.
        CaseUpdateActionDto:
```

ADAPTIVE RECOMMENDATIONS

CROSS-REFERENCES TO RELATED APPLICATIONS

This application claims priority to U.S. Provisional Patent Application No. 62/566,139 filed on Sep. 29, 2017 in the United States Patent and Trademark Office, entitled "ADAPTIVE RECOMMENDATIONS," the disclosure of which is incorporated by reference herein in its entirety.

BACKGROUND

Example embodiments are related to the field of data analytics, and specifically to generating action recommendations or action scripts for data sets. Specifically, example embodiments are directed to methods, devices, systems and computer readable media for identifying similarities in data sets from a plurality of different types of sources and generating a set of recommendations based on past user behavior on similar data sets.

Before "big data" systems can analyze data to provide useful results, the data needs to be added to the big data system and formatted such that it can be analyzed. This data onboarding presents a challenge for current cloud and "big data" systems. Typically, data being added to a big data system is noisy (e.g., the data is formatted incorrectly, erroneous, outdated, includes duplicates, etc.). When the data is analyzed (e.g., for reporting, predictive modeling, etc.) the poor signal to noise ratio of the data means the results are not useful. As a result, current solutions require substantial manual processes to clean and curate the data and/or the analyzed results. However, these manual processes cannot scale. As the amount of data being added and analyzed increases, the manual processes become difficult to implement.

The rapid proliferation of data from a variety of sources: internal and external, unstructured and structured, traditional and new data types, presents an enormous opportunity for businesses to gain valuable insights that can help them make improved and timely decisions that will win, serve, and retain customers. A key part of preparing these data sources for analysis is the ability to merge or join (e.g., blend) two or more data sets originating from different sources into a single file ready to be used for further processing, such as by a big data analytics system. The heterogeneity and size of data sets introduce tremendous challenges to understand the meaning of words, which could be used as a basis for downstream applications, such as identifying messages on a social media website or a communication feed about a particular product.

Further, homogeneous data from two or more sources may have different formats. For example, data from a first data source may be in a different format from data in a second data source. A data format can include an arrangement of content or a type of content. Therefore, data can be in diverse formats even though the data is representing a same type of information (e.g., street, ZIP code, city, data, etc.). For example, "avenue" can be abbreviated as "AV" or "Ave." A date can be spelled out to include month, day and year, or a date can be represented by numbers separated by dashes or slashes. Therefore, it can be difficult to interpret all of the data if the data has a different format or includes different information.

An example data source can be a blog. Blogs can include demographic information. A user may desire to collect demographic information from blogs. In order to more easily manipulate the blog data, all of the demographic information can be entered in the spreadsheet that includes columns and rows of data. For example, a city, state, ZIP Code, and/or country could correspond to a column of data in the spreadsheet. Further, each of a plurality of blogs can correspond to a row in the spreadsheet. However, demographic information in a first blog can be in a different format or include different information from demographic information in a second blog. Therefore, it would not be easy for user to analyze the demographic information for the blogs unless the blogs were similarly formatted or included similar information. It would be very time-consuming to analyze each of the differently formatted demographic information.

Preparing data for performing analytics can be a very time-consuming process. Given the large amount of data that may be used in analytics, preparing the data can take a long time. Options that are currently available cannot scale when there is a large amount of data being processed. Since data sets are not necessarily in the same format with the same structure, handling the diverse data can be expensive and prone to errors.

BRIEF SUMMARY

In accordance with some example embodiments, similarities in data sets from two or more sources are identified. Regardless of the format or structure of each of the data sets, similarities can be identified. An example embodiment can generate a set of relevant recommendations based on past user behavior on similar data sets (e.g., column of data).

Example embodiments reduce an amount of time required to process large quantities of data by providing adaptive recommendations. The data is processed in order to perform data enrichment. Data enrichment can include enhancing, refining, and/or making improvements to data so that that data is in a form that can be more easily used by users. Data enrichment can include correcting typographical errors or misspellings, or adding additional information. For example, a business may have a database comprising customer address information (e.g., street number, apartment number, street name, city, ZIP Code, etc.). Address information is merely an example. Other types of information can include, for example, a telephone number, credit card information, employer, etc. However, customers may enter their address information in different formats. For example, a first user may enter "Street" in their address as "St." and a second user may spell out "Street" in their address. Therefore, even though both the first user, and the second user have "Street" in their address, they have spelled it differently. This is merely an example and example embodiments apply to a plurality of different types of data which may be spelled differently or formatted differently. Therefore, it would be beneficial to enrich the data so that it is consistent and can be more easily processed by the user.

Data can be in the form of, for example, spreadsheet columns. A spreadsheet can be an electronic document in which data is arranged in rows and columns of a grid. A variety of actions can be provided to a user in order to enable them to prepare their data into a form that they would like their data to appear. A user can manually add an action to reformat the data. The actions can also be known as transform scripts. Actions can include, for example, obfuscate, date formatting, reformat, enrich columns, extract, split columns, etc. Actions can be done manually by a user using a graphical user interface, actions can be recommended to a user by the adaptive recommendation system, or actions can be based on a combination of manual inputs by the user and recommended actions. The actions that can be applied to the data can be based on the profile results of the data.

Over time, a user tends to perform the same actions on the same kinds of data. For example, for a column that is directed to credit card information, users may often obfuscate some of the numbers or the user may remove the credit card information. Therefore, in accordance with some example embodiments, actions are recommended to a user based on past behavior. This process of suggesting actions based on past behavior can be called adaptive recommendations. The system adapts to the user's use of the system. The system learns by the customer's previous actions and makes a recommendation based on previous actions on the data.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 2 illustrates a profile fragment, in accordance with some example embodiments.

FIG. 3 illustrates an action, in accordance with some example embodiments.

FIGS. 4A and 4B illustrate outputs during the process of making adaptive recommendations, in accordance with some example embodiments.

FIG. 11 illustrates a user interface displaying enrichment options for a column of data in a data set, in accordance with some example embodiments.

DETAILED DESCRIPTION

Figure 1:
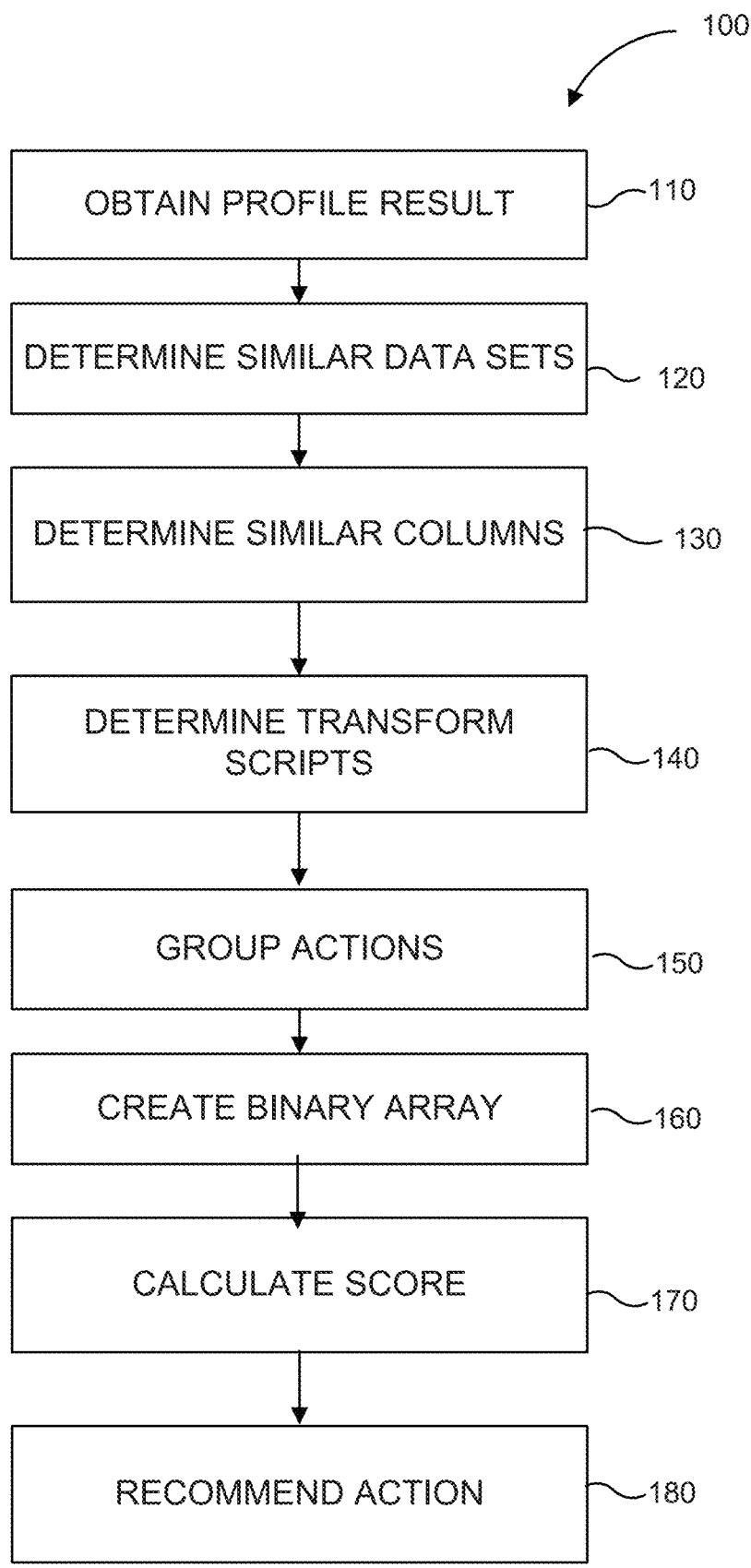
FIG. 1 illustrates an overview of a method for providing adaptive recommendations, in accordance with some example embodiments.

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

In accordance with an example embodiment, data enrichment is performed and recommendations can be provided to the user. The data enrichment and recommendations can be based on a prior acceptance of recommendations for data sets having data that is similar to the data set that is currently being cleansed and/or prepared. The data enrichment can also include data cleansing, such as detecting and correcting data.

In order to enrich the data, an action script can be applied to the data. The action script can be based on actions that were performed on data having, for example, a similar format or structure. However, data is often obtained from different types of sources. Further, data from different sources and data from within a same source (e.g., database, client, etc.). may not be in a same format or structure. This makes it extremely expensive and tedious for a user to create an action script to apply to the data. Even though similar actions may be applied to the data, it may be difficult to determine whether the data is the same as the past data that has been analyzed.

For example, a user may create rules for a first data set. The set of rules may also be called an action script. The first data set may include several different columns of data. When the user receives a second data set, the order of the content in the second data set may be different from the first data set. Therefore, the rules that were created for the first data set may not be directly applied to the content in the second data set since the order of the data is different or expressed differently.

In the past, a user may create a manual script order to handle the different data sets. However, creating a manual script of actions to be performed to the data set can be time-consuming, expensive and prone to errors. Therefore, it can be difficult to handle adversity in large scale data (e.g., big data).

Example embodiments can identify similarities in data sets from two or more sources regardless of format or structure, and a set of recommended enrichment actions can be generated. The recommendations can be based on past user behavior on similar data sets. Therefore, regardless of the source, structure or content in the data set, an example embodiment can determine similarities between data sets. An example embodiment can assist the user in determining an action script to be applied to the second data set based on the history that was obtained from one or more previous data sets. Over time and/or with increased use, the relevance of the recommendations increase based on past user behavior on similar data sets (e.g., the history of actions that were applied to a data set).

Adaptive recommendations ("rxs") can be adaptive recommendations for actions that modify users' data based upon actions the users have applied to similar data sets in the past. A sequence of actions applied to a data set is called a transform script. The creation of adaptive recommendations is triggered by the introduction of a new data set. Data sets (e.g., data set profiles) similar to the new data set can be found in a data store. Transform scripts that the user has applied to the similar data sets can also be retrieved from the data store. A data set that has a similar profile to a current data set and its corresponding transform script can be identified analyzed to see if historical actions are prevalent enough to warrant recommending the historical actions for the new data set.

FIG. 1 illustrates an overview of a method 100 for providing adaptive recommendations, in accordance with some example embodiments.

When a new document is received from a data preparation pipeline, an adaptive recommendation process can be initiated. A new document can also be known as a data set. A document or data set can include a plurality of columns of data. A column can correspond to, for example, dates, telephone numbers, names, occupations, etc. The data in the data set can be profiled in order to obtain profile results. A new document (e.g., data set) can be received when the user uploads a document to the system. The document can be selected from a cloud environment and can enter the data enrichment service system to begin processing. The data is enriched by enhancing the data so that it contains information that is in accordance with the specifications of the user. An example is described with respect to a single column, however, the example embodiments can be applied to a plurality of columns within, for example, a data set.

At step 110, the system obtains a profile result for the new data set. The system can be preconfigured with profile rules for data sets. A profile result is a report on the data and provides information for each column of data in the data set. A profile result can provide metrics information, semantic information, and/or data type information about the data. The profile results can be used in order to determine which actions should be recommended to the user. Prior data sets are data sets that have been received and profiled prior to the new data set. A profile engine can be used to produce profile results for the new data set and the previous data sets. FIG. 2 illustrates a profile fragment 200, in accordance with some example embodiments.

At step 120, prior data sets that are similar to the current data set are identified. Profile results for the prior data sets, as well as the associated action scripts for those prior data dates are identified. An action script from the prior data sets indicates a set of actions that the user opted to apply to that data set. Each pair can be called {ProfileResults, ActionScript} which are represented by the variable $T_i$. The variable T can include $\{T_0, T_1, \ldots T_n\}$ which includes a plurality of different profile results and their corresponding action scripts. FIG. 3 illustrates an action 300, in accordance with some example embodiments.

At the end of step 120, data sets that are similar to the current data set and their corresponding transform scripts are identified. The data sets that are identified as being similar can be known as a similar prior data set. For example, four data set profiles may be identified as being similar to the current data set. Therefore, the four data set profiles and their corresponding transform scripts are identified as being similar prior data sets. The data set profiles are identified as being similar since they have similar column information.

At step 130, each of the columns in the current data set are compared with columns in the similar prior data sets in order to identify similar columns. For example, a first column in the current data set is compared with the identified similar prior data sets. For each of the identified similar prior data sets, columns of the prior data sets that are similar to columns in the current data set are identified. A first similar prior data set may have, for example, two columns similar to the current data set, a second similar prior data set may have zero columns similar to the current data set, a third similar prior data set may have one columns similar to the current data set, and the fourth similar prior data set may have two similar columns to the current data set.

For each column in the new data set, a list can be generated. The list identifies columns from the similar prior data sets that are similar to columns in the new data set. Therefore, similar columns are identified as a step toward identifying similar data sets. Columns within the $T_i$'s (each $T_i$ will have its own ProfileResults, which in turn contains a varying number of profiled columns) that are similar to $C_j$ are identified. $C_{ji}$ can denote the column profile results within $T_i$ that is similar to $C_j$. The variable C can denote $\{C_{j0}, C_{j1}, \ldots C_{jn}\}$.

Columns from prior data sets that are similar to a column in the new data set are identified for each column in the new data set. For each column in the new data set, a list of similar columns from the similar prior data sets are identified. All of the similar prior data sets that were identified in step 120 may have columns that are similar to columns in the new data set, or only some of the similar prior data sets that were identified in step 120 may have columns are similar to columns in the new data set.

At step 140, transform scripts are identified for the similar prior data sets that have columns that are similar to the new data set. As indicated above, not all of the similar prior data sets may have columns are similar to the new data set. Therefore, transform scripts are identified for only similar prior data sets that also have columns similar to the new data set. If a similar prior data set does not have any similar columns to the new data set, then the transform script for that similar prior data set will not be identified. The similar prior data set and its corresponding transform script can be known as a transform.

For each $C_k$ in C, the associated actions are identified. Each $C_k$ is part of a full data set's ProfileResults, which in turn is part of a $T_i$, which also contains an ActionScript. Some of the actions within that ActionScript are specifically associated with $C_k$. The actions within the ActionScript are specifically associated with $C_k$ are the actions of interest. The associated actions can be gathered into a group represented by the variable A.

At step 150, similar actions are grouped together. For example, a column may be identified as corresponding to date information. In a first similar prior data set having a similar column, a date column may be reformatted to month, day and year. In the second similar prior data set having a similar column, a date column may be reformatted to month and year. The action that is applied in both columns is a reformatting action, although the format differs. Some of the actions within A may differ only in minor details. The actions may differ only in parameters to those actions that are not relevant for the purpose of making recommendations. At step 150, reformatting actions that have the same output format are grouped together. Therefore, equivalent classes of actions that have the same output formats are grouped together.

At the end of step 150, for the single column in the new data set, similar prior data sets having similar columns and the equivalent classes of actions that were applied to the similar columns in the similar prior data sets are identified.

At step 160, for each action within the group represented by the variable A, a binary array can be created. The binary array is created in order to determine whether an action that was applied to a similar column in the similar prior data set can be applied for a particular column in the new data set. The binary array can include four elements representing the four similar prior data sets. The size of the binary array will vary according to the number of similar prior data sets. Therefore, if ten similar prior data sets were identified at step 120, than the binary array would have ten elements. A document would have a value of "1" if a similar action was applied in a document would have a value of "0" if a similar action was not applied.

For example, for a credit card column in the new data set, 12 similar prior data sets may have been identified. Of the 12 similar prior data sets, 10 of the similar prior data sets may have a credit card column. Of the 10 similar prior data sets having a similar credit card column, an obfuscate action, in which some of the numbers in the credit card are obfuscated, may have been applied on the credit card column for nine of the 10 similar prior data sets.

FIGS. 4A and 4B illustrate outputs 400 during the process of making adaptive recommendations, in accordance with some example embodiments. The outputs can be generated by the adaptive recommendation system and may not be presented to the user. Binary array 420 is an example binary array for an action. As shown in FIG. 4B, columns (e.g., email column, first name column, gender column) of a data set are identified with a corresponding binary array 420. The array includes values of ones and zeros representing the history of an action in relation to a the new data set (e.g., email column in the new data set).

For each $T_i$ in T, it can be determined whether or not $A_m$ is present in the ActionScript for $C_{ji}$. The Boolean $B_i$ can denote whether $A_m$ is present in $C_{ji}$. This produces a Boolean vector of length n (one for each $T_i$) which can be represented by variable B.

At step 170, a score for the actions is calculated. The score can be calculated based on a statistical distribution model. A score of 1.0 would indicate that the action applied to every single one of the similar columns in a similar document. If an action was never applied then the score would be zero. If an action was used more recently than is more likely to be recommended. Actions that were applied more recently will be weighted more than actions that were applied less recently. The recency of documents can be identified based on the dates of the documents. If an action was never applied, then the score of the action would be zero.

Therefore, at step 170, a score is calculated based on a weighted sum of B, where more recent action decisions (i.e. Boolean values appearing later in B) are weighted more heavily. Various weighting schemes are possible, including uniform, binomial, and exponential weighting schemes. The score can be identified by the variable S. FIG. 4B illustrates example scores 430 for an email column, a first name column and a gender column of the data set.

At step 180, recommended actions are provided to a user. If S is larger than some threshold, then action $A_m$ can be recommended for column $C_j$. A recommendation engine can review the profile results and, based on previous actions for profile results, provide a recommended action for current set of data.

Alternatively, in another example embodiment, a machine learning algorithm, such as a neural network or support vector machine can be used for supervised learning, such as, logistic regression. In this scenario, the various combinations {C,A} of columns and actions are, in terms of machine learning terminology, the feature vectors, and the corresponding B values are the labels. Having trained such a model, B values can be predicted for new {C,A} combinations. As the user continues to use the system, the model can be evolved because new {{C,A},B} labeled data points augment the training data set. A neural network can be used to obtain the threshold value. Further, a neural network can be used to calculate the score.

All of the recommended actions for all columns from step 180 can be gathered and presented to the user and presented on a user interface.

Figure 5:
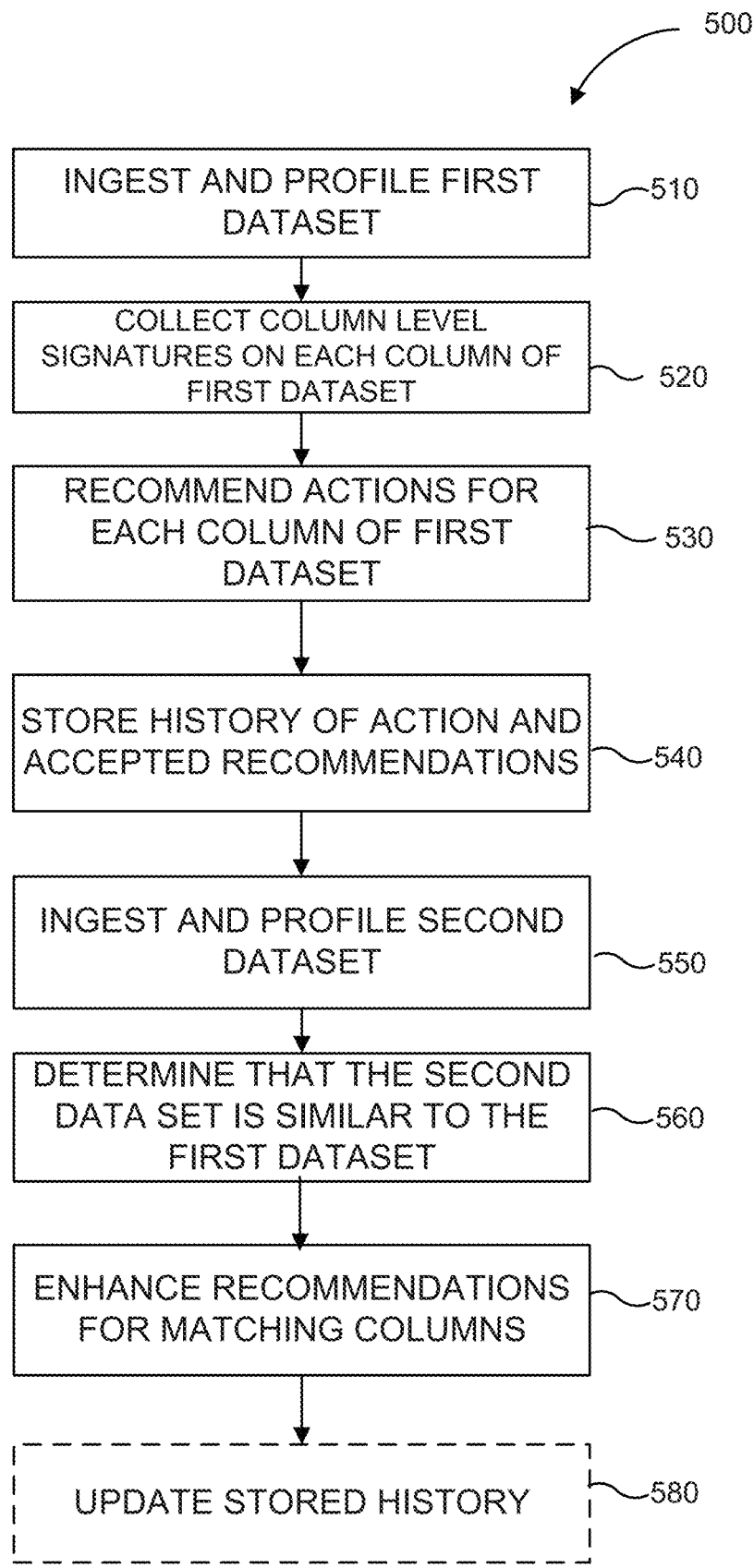
FIG. 5 illustrates a flowchart of a method for performing adaptive recommendations, in accordance with some example embodiments.

FIG. 5 illustrates a flowchart of a method 500 for performing adaptive recommendations, in accordance with some example embodiments. The method for performing adaptive recommendations can be performed by an adaptive recommendation system.

Figure 6:
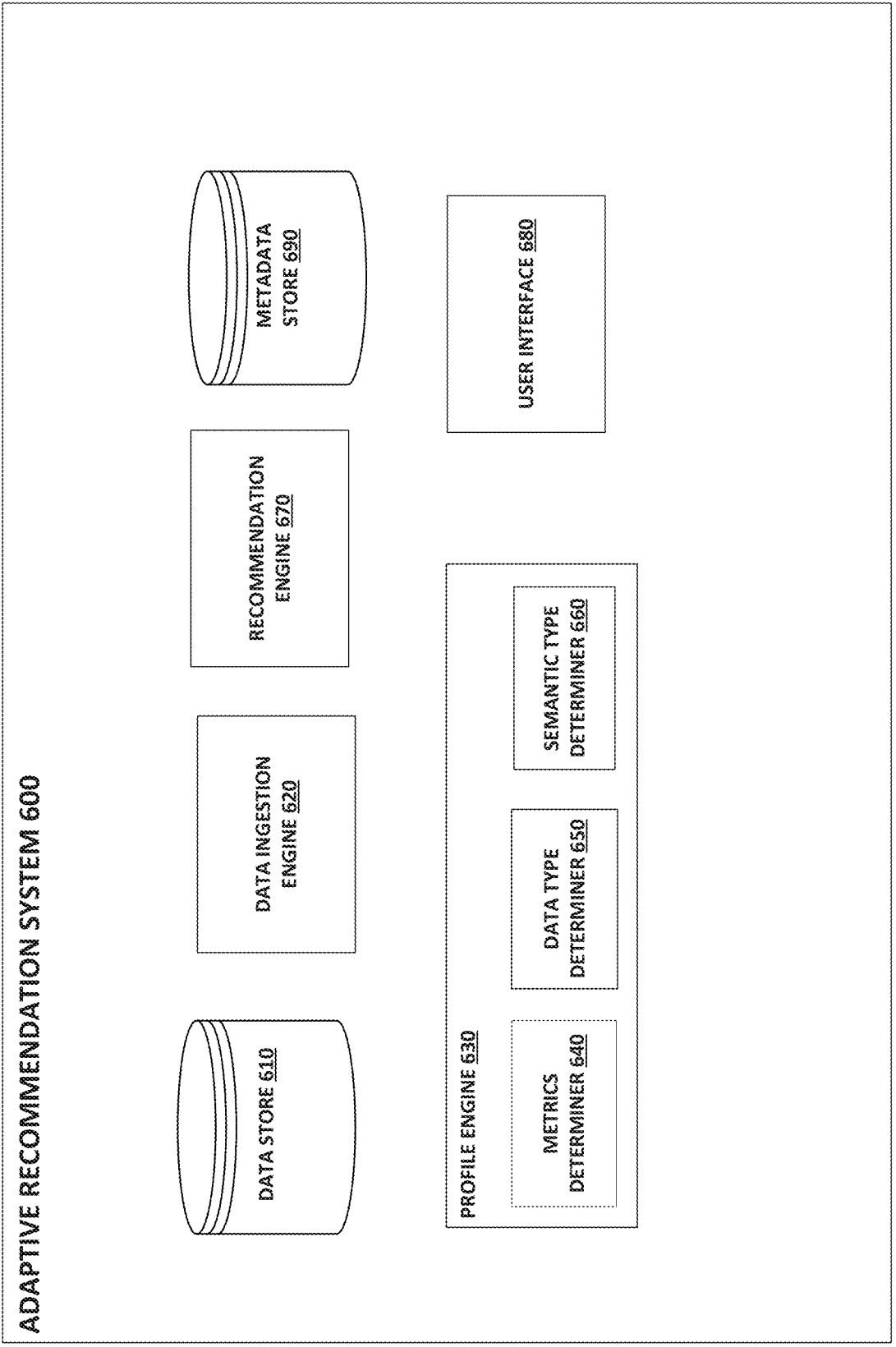
FIG. 6 illustrates a block diagram of an adaptive recommendation system, in accordance with some example embodiments.

FIG. 6 illustrates a block diagram of an adaptive recommendation system 600, in accordance with some example embodiments. The adaptive recommendation system 600 can include a data store 610, a data ingestion engine 620, a profile engine 630, a metrics determiner 640, a data type determiner 650, a semantic type determiner 660, a recommendation engine 670, a user interface 680 and a metadata store 690. The metrics determiner 640, data type determiner 650, and semantic type determiner 660 can be part of the profile engine 630, or the metrics determiner 640, data type determiner 650, and semantic type determiner 660 can be separate from the profile engine 630. The data ingestion engine 620, the recommendation engine 670 and the profile engine 630 can include a processor and a memory. The operation of the components of the adaptive recommendation system 600 is explained in greater detail below.

At step 510, a first data set is ingested into the adaptive recommendation system and profiled. Data ingestion can include obtaining and importing data from a data store and sending the data to a profiler. A data set can include a plurality of columns of data. A column of data can be from, for example, a spreadsheet of information. A spreadsheet can include multiple columns of data. For example, a retail business may have a spreadsheet including columns of customer information (e.g., customer address, credit card information, purchase history, etc.). The retail business may want to target ads towards particular user's. However, there may be inconsistencies or errors in the customer information. Therefore, an example embodiment will enrich the information so that it can be more conveniently and accurately used by the retail business.

Enriching the data can include enhancing the data so that it is in accordance with the specifications of a user. Enriching the data can include minimal actions or can include extensive actions in order to obtain data that is in accordance with the specifications of the user. The specifications of the user can be based on the users desired goals with the data. A retail business is merely an example, and other types of business and various types of information can be aggregated in a spreadsheet. For example, Twitter posts and Facebook posts can be collected in a spreadsheet. Various kinds of data that can be collected in a spreadsheet can be used in the example embodiments.

The example described in FIG. 5 describes comparing columns of data in the first data set and the second data set. However, an example embodiment can be applied to performing data comparison to other than columns of data. Further, columns of data in a spreadsheet are given as an example, however other types of data that are formatted in a column can be used in the example embodiments. Further, the example embodiments are not limited to performing analysis on columns of data.

After the data is ingested, the data is profiled. A profile can include metrics information, data type information, and semantic type information about each of the columns of data in the spreadsheet. The metrics information, data type information, and semantic type information can be metadata that describes the data in the columns of data in the spreadsheet. A single profile can include metric information, data type information, and semantic type information for all of the columns in the spreadsheet. A profile can be generated for a data set.

The profiling that is performed can also be known as deep profiling. The profiling can be called deep profiling since the data in the column is profiled in detail and all of the data in a column is profiled. Further, the profiling can be considered to be a deep profiling since each column of data is profiled in detail and is not merely limited to generic information. The deep profiling can including determining metrics information, data type information, and semantic type information for the column of data.

Further, different types of data can be enriched. Data that can be enriched, in accordance with example embodiments, can include data directed to the following: Country, Province (State), Jurisdiction (County), Population, Elevation (Meters), Timezone, Longitude, Latitude, ISO Country Codes, Federal Information Processing Standards (FIPS), Country Name, Capital, Continent, Population, Languages Spoken, Phone Country Code, Postal Code Format, Postal Code Regex, Phone Country Code, Currency Name, Currency abbreviation, top level domain (TLD), Square KM and Geonameid. However, these are merely examples and other types of data can be enriched.

At step 520, the adaptive recommendation system collects column level signatures on each column in the first data set. A column level signature can also be known as a fingerprint. The column level signature or fingerprint contains information or metadata about the data in each column of the first data set. Column level signatures are described, however example embodiments are not limited to column information.

At step 530, the system can recommended actions to be performed for each column. The recommendation engine makes an initial recommendation based on the data that is profiled. At step 530, previous data set have not been analyzed by the system. Therefore, the initial set of recommendations can be called initial recommendations. Since there is currently no history that can be used for reference, the initial recommendation can be based on heuristics. The system can use heuristic information to provide a recommendation.

In response to the recommended actions, the user can accept the recommended actions or the user can manually perform other actions. A user can manually input instructions for performing actions that are not on a list of recommended actions.

At step 540, as the user interacts with the first data set, the user's interactions are maintained in a history. The history can be stored in the metadata store 690. The metadata store can also be known as a history store or a history metadata store. The metadata store can be part of the data store 610 or the metadata store can be separate from the data store 610. The user interactions can include, for example, manual actions and changes made to the data. The history can also include recommendations that were suggested by the system and accepted by the user. The recommendations can include actions to each column of data in the data set that were made on each column of data in the data set. The history can include all of the column level signatures of the data set and the actions the user took against the data set. The history will record whether or not the user accepted the recommended actions, and any manual actions that were performed by the user. The system will take the history information into account when providing future recommended actions.

At step 550, a second data set can be ingested and profiled by the system. At the time that the second data set is ingested and profiled, the user may not be aware as to the type of content that is in the second data set.

At step 560, a similarity determination algorithm can be used to determine whether the second data set is similar to the first data set. Similarity of the content in the second data set to the first data set can be determined. A first data set and the second data set is described, however, there can be more than two data sets. A subsequent data set can be compared with previous data sets in order to determine the type of content in the data set. For example, a $10^{th}$ data set can be compared with the previously analyzed data sets (e.g., data sets 1-9 that were analyzed before the $10^{th}$ data set). Any subsequent data sets can be compared with previous data sets in order to determine actions to recommended for the data set.

The similarity discovery for similarity matching is performed based on a comparison of columns of data between data sets. When the category for the column of data has been identified, recommended actions for similar categories of columns of data can be easily identified. During similarity matching, a matching score can be provided for a column of data. For example, if a column of data in the second data set corresponds to a city, the column of data would have a higher similarity score to a column of data in the first data set that corresponds to, for example, a city. The column of data in the second data set that corresponds to the city would have a lower similarity score to a column of data in the first data set that corresponds to, for example, credit card information. As more data sets are processed, subsequent data sets are likely to have columns that match previously processed data sets. Further, similar columns are likely to use similar actions for enriching the data.

Therefore, on a column by column pair, a score can be built up for similar pairs of columns between two different data sets. The score can be called a pair score since it is a combination of a first column from a first data set and the second column from the second data set. Further, the pair scores can be aggregated for all of the columns of data between the two data sets, and it can be determined how similar the first data set is in relation to a second data set.

If a column in the first data set matches a column in the second data set, then the actions that were performed in the column in the first data set can be recommended to the user. The first data set may have a plurality of different columns in a first order, and the second data set may have a plurality of different columns in the second order. The order of the columns will not affect the determination of whether a column of data in the first data set matches a column of data in the second data set. The columns are determined to be similar based on the column level signature.

At step 570, a recommended action to apply to the second data set can be provided to the user. The recommended action can be for a column of data in the second data set that matches a column of data in the first data set. The recommended action can be based on a history of actions that were performed in the first data set. Since the recommended action can be based on a history of actions that were performed in the first data se, the recommendations can be called enhanced recommendations. The recommendations are enhanced since they are not only based on the profiling of the data, but are also based on a history of actions that were applied to a similar data set. Specifically, since the column of data in the second data set is similar to a column of data in the first data set, the system can determine that similar actions should be applied to the column of data in the second data set.

For example, if "Adobe" is mistyped in a column of data, the system can recommend one or more options for correcting the error. Recommendations can include alternative spellings, abbreviations, and/or full spellings of company names. This is merely an example, and the recommendations can be based on the type of error or invalid information that is identified.

As another example, city information can be enriched. A column of data may include city information. However, it may be beneficial to a user if additional information was included with the city information. For example, it may be beneficial to a user if demographic information, population information, weather information, etc. was included with the city information. That is, it would be beneficial if the data was enriched to include additional information that would be of greater benefit to the user. Such information would be of greater benefit to the user, if for example, user is determining areas to sell their product. Therefore, in accordance with an example embodiments, enrichment information can include not only corrections (e.g., correcting errors, misspellings, etc.) to the information in the column, but the enrichment of the data can also include providing additional data corresponding to the column of data. Further, each of the row in the column can be provided with suggested enrichment information.

At step 580, the process can be repeated for additional data sets. The history will continue to be updated based on any additional data sets that are processed by the system. The history of manual actions for the actions against the recommendations that were made by the user are used to create a history for the data set. As more data sets are introduced into the system, the history can continue to be updated. As more data sets are analyzed by the system, recommendations can become more relevant to a user.

History information is collected and the history information is tied to column level signatures. As more data sets are ingested and profiled, the fingerprint information that is collected in the metadata store will grow. The data set information can include the column information, and the history of actions that the user has taken for that column of information.

Since there is a history of recommendations for a previous data set, the recommended actions for the second data set will take into account the history of actions from the previous data set and is not limited to the initial set of recommended actions. For example, if the system determines that a column of data in the second data set matches a column of data in the first data set, than the system can recommend actions for the column of data in the second data set based on the history information (e.g., recommended actions, recommended actions accepted by the user, and/or manual actions performed by the user) for the column in the first data set. The column of data in the second data set can be determined to match the column of data in the first data set based on the column level signatures or fingerprints for the column of data. The system will determine a data set from the metadata store that has a similar column level signature.

The adaptive recommendation algorithm of the adaptive recommendation system can take the history of actions and blend the history of actions with existing recommendations. Therefore, enhanced recommendations can be provided for the second and subsequent data sets. Enhanced recommendations will be more relevant to the user than initial recommendations that are provided merely based on the profiled data. The enhanced recommendations can include recommendations that were accepted by the user, and the enhanced recommendations can include avoiding recommendations that were not desired by the user. Therefore, the recommendations that are provided to the user are more likely to be accepted by the user.

The system may be capable of working independently of the user. The system may not need user supervision or user input and can automatically determine which actions should be applied to data. If, for example, the data sets that are ingested and profiled by the system repeatedly include the same information, it can be determined that the recommended actions will be the same. Therefore, it may not be necessary to require user input or user supervision in order to determine which actions should be performed on the column of data and the system can independently determine which actions should be performed on the data. For example, instead of providing recommended actions to the user, the system can determine which actions should be performed for a data set, and can select recommended actions without user intervention. Therefore, the adaptive recommendation system is capable of performing machine learning. The adaptive recommendation system does not need to be programmed for every possible option of data that is in a data set. Instead, the adaptive recommendation system is configured to apply an algorithm in order to make inferences and learn from a user's past actions with respect to similar data sets.

Figure 7:
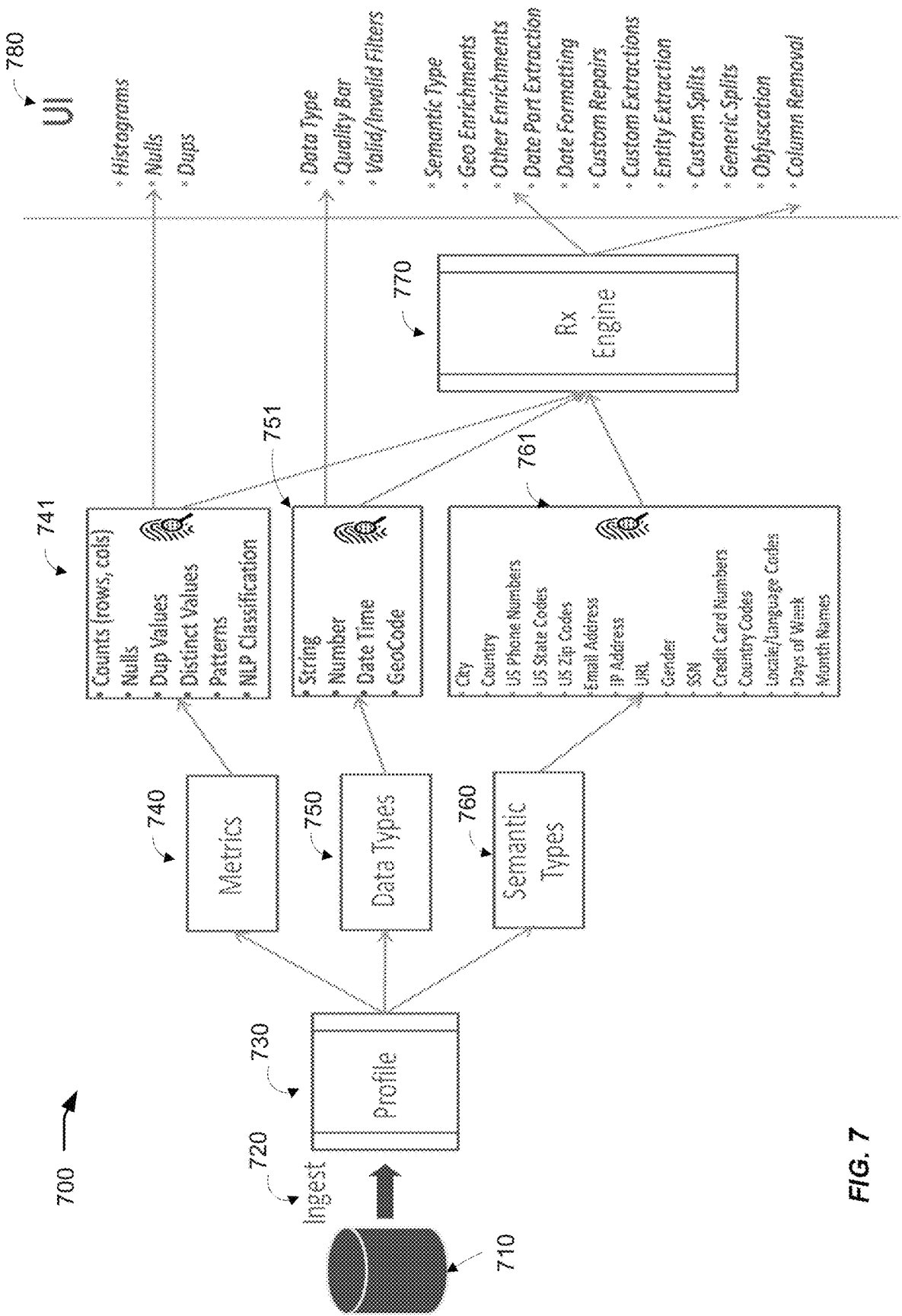
FIG. 7 illustrates an adaptive recommendation flow diagram, in accordance with some example embodiments.

FIG. 7 illustrates an adaptive recommendation flow 700 diagram, in accordance with some example embodiments.

At step 710, data can be stored in a data store. The data store can be, for example, data store 610 of the adaptive recommendation system 600.

At step 720, the data can be ingested. The data can be ingested by data ingestion engine 620. Data ingestion can include obtaining and importing data from a data store and sending the data to a profiler. Data can be streamed in real-time or in batches.

At step 730, the data can be profiled. The data can be profiled by profiler 630. A profile can include metric information, data type information, and semantic type information. Each of the columns of data include metric information such as counts, number of nodes in the column, duplicate values, patterns that are in the columns, natural language processing classifications (e.g., short text, medium text, verbose text, etc.)

At step 740, metric information for the data can be determined in generating the profile. The metric information can be determined by metrics determiner 640. The metrics information can be used to determine a metric column level signature or metric fingerprint 741. Each column of data can have a column level signature or fingerprint that includes information about the column. The metric fingerprint 741 can include information such as number of rows and columns in a data set, fields in the data set having null values, fields in the data set have duplicate values, fields, having distinct values, patterns, and/or Natural Language Processing (NLP) classification of the data in the data set.

At step 750, data type information for the data can be determined for generating the profile. The data type information can be determined by data type determiner 650. The data type information can be used to determine a data type column level signature or data type fingerprint 751. Data type information can include whether the data in the column is a string, whether the string includes letters and/or numbers, data and time information, and/or whether the data in the column is a geocode (e.g., geographical information), etc.

At step 760, semantic type information for the data can be determined for generating the profile. The semantic type information can be determined by semantic type determiner 660. The semantic type information can be used to determine a semantic type column level signature or semantic type fingerprint 761. Semantic type information can include leveraging reference data. The reference data can be included as part of the knowledge service and can also be augmented by the customer and/or user. Reference data can include a large set of patterns or entities that are known to the system or are known to the customer.

A pattern in the data can be recognized by the system. Patterns in data can be recognized based on identifiers, codes, Yes/No Flags, dates, quantities, free form text, social security numbers, credit card numbers, country codes, locale/language codes, email address, Internet protocol (IP) address, uniform resource locator (URL), phone numbers, state codes, country codes, ZIP Codes, and gender codes. A date can be represented in, for example, 30 different formats. An email address, such as BillSmith@yahoo.com can include, for example, a user name "BillSmith", an "@" symbol, a domain (e.g., Yahoo, Gmail), and an extension (e.g., .net, .com, .gov). These are merely examples and patterns can be identified in other types of information.

At step 770, the profiled data can be processed in a recommendation engine. The data can be processed by recommendation engine 670. The recommendation engine 670 can receive the metrics information, data type information, and semantic type information in order to build a set of recommended actions against the data. The recommendation engine can make recommendations for each column of data in a data set. For example, if there is a city with a lot of invalid values, the recommendation engine can recommend that those invalid values to the information be fixed. As another example, there may be phone numbers with invalid formats. The recommendation engine can recommend actions in order to fix the phone numbers so that they are in a valid format. Further, the recommendation engine can also determine whether there is sensitive data in a column based on the profile data.

At step 780, information can be displayed on a user interface. The user interface can, for example, user interface 680. The user interface can be, for example, on a desktop computer, laptop computer, tablet, mobile phone, or any portable device with a display.

Figure 8:
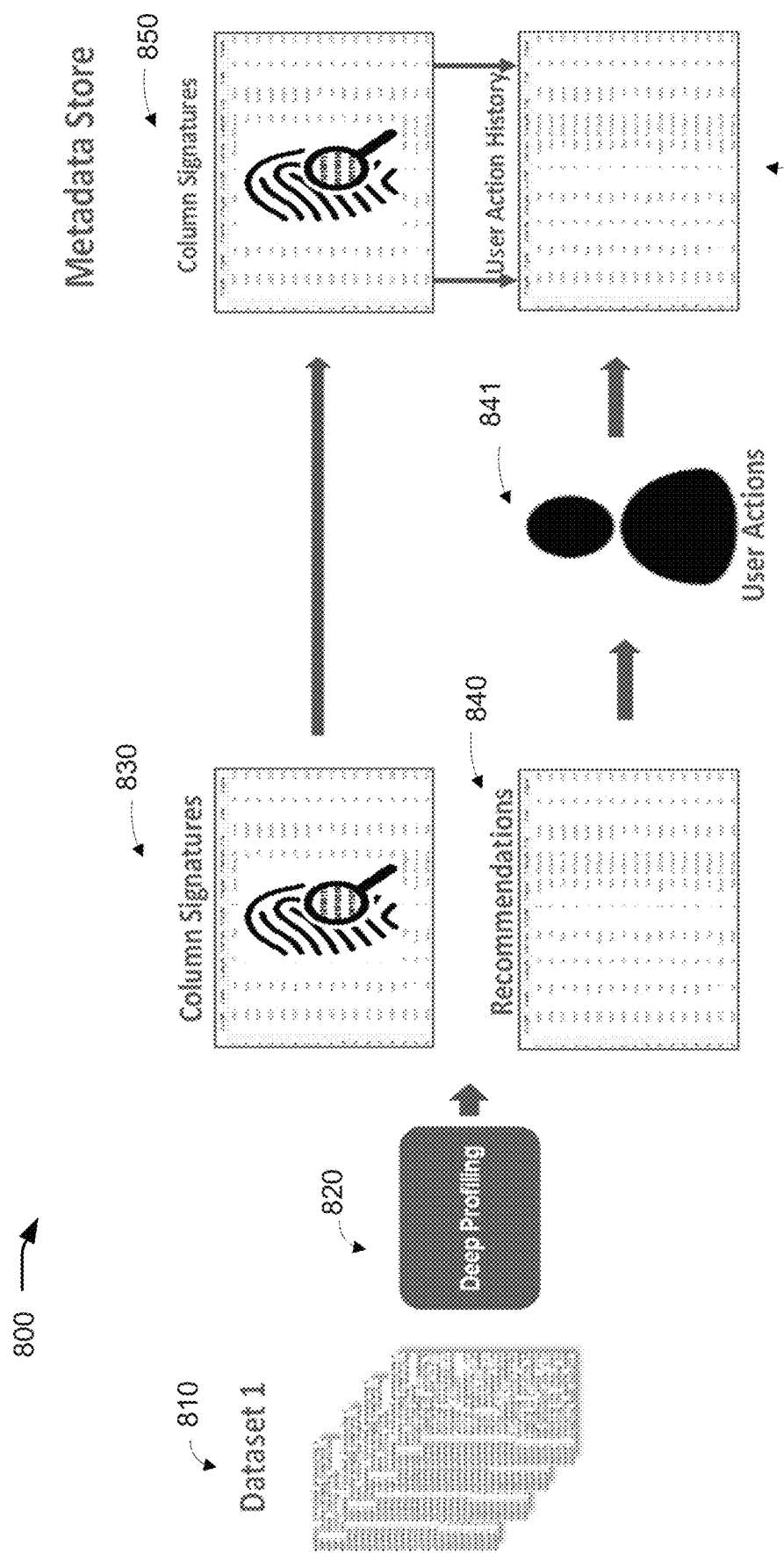
FIG. 8 illustrate an overview of an adaptive recommendation flow, in accordance with some example embodiments.

FIG. 8 illustrate an overview of an adaptive recommendation flow 800, in accordance with some example embodiments.

At step 810, a first data set is ingested. At step 820, the first data set is profiled. Columns of data in the first data set can be profiled for metrics information, data type information, and semantic type information. At step 830, column level signature or fingerprints are obtained for the data. The column level signature can include a metric information, data type information, and semantic type information. At step 850, the column level signatures can be stored in the metadata store.

At step 840, initial recommendations can be provided to a user 841. At step 860, a user action history can be created based on the recommended actions that are selected by the user. The user action history can also be stored in the metadata store. The metadata store stores column level signature information, as well as user action history data for each data set. The column level signature information and the user action history data can be used in combination so as to provide more enhanced recommendations for future similar data sets.

Figure 9:
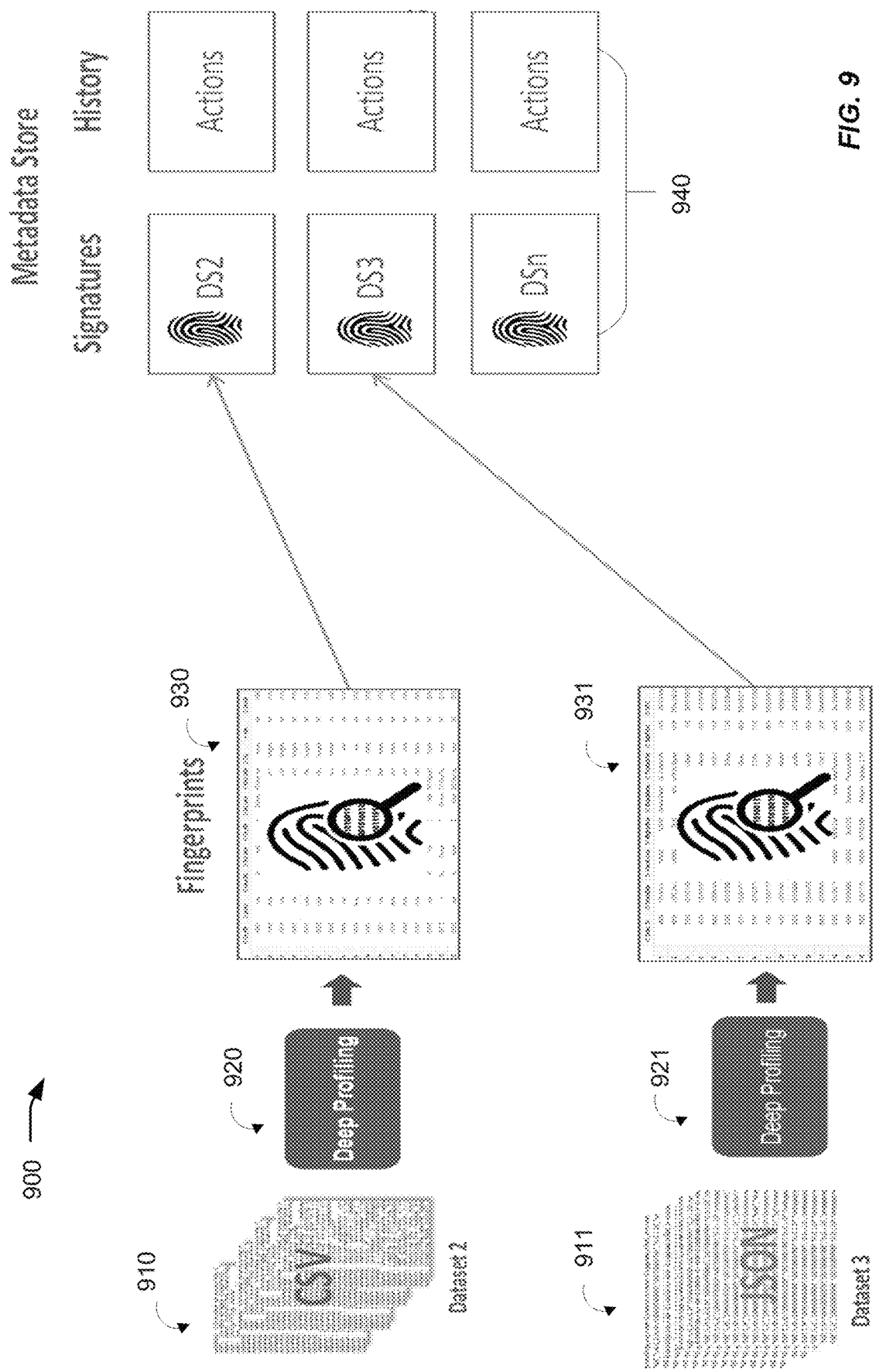
FIG. 9 illustrates an overview of a flow for profiling data sets, in accordance with some example embodiments

FIG. 9 illustrates an overview of flow 900 for profiling data sets, in accordance with some example embodiments.

At step 910 a second data set is ingested and profiled at step 920. At step 930, column level signatures information is obtained for the second data set. At step 940, the column signature information and user action history for the second data set is stored in the metadata store.

At step 911 a third data set is ingested and profiled at step 921. At step 931, column level signature information is obtained for the third data set. At step 940, the column signature information and user action history for the third data set is stored in the metadata store. The metadata store stores column level signature information and user action history for a plurality of different data sets.

Figure 10:
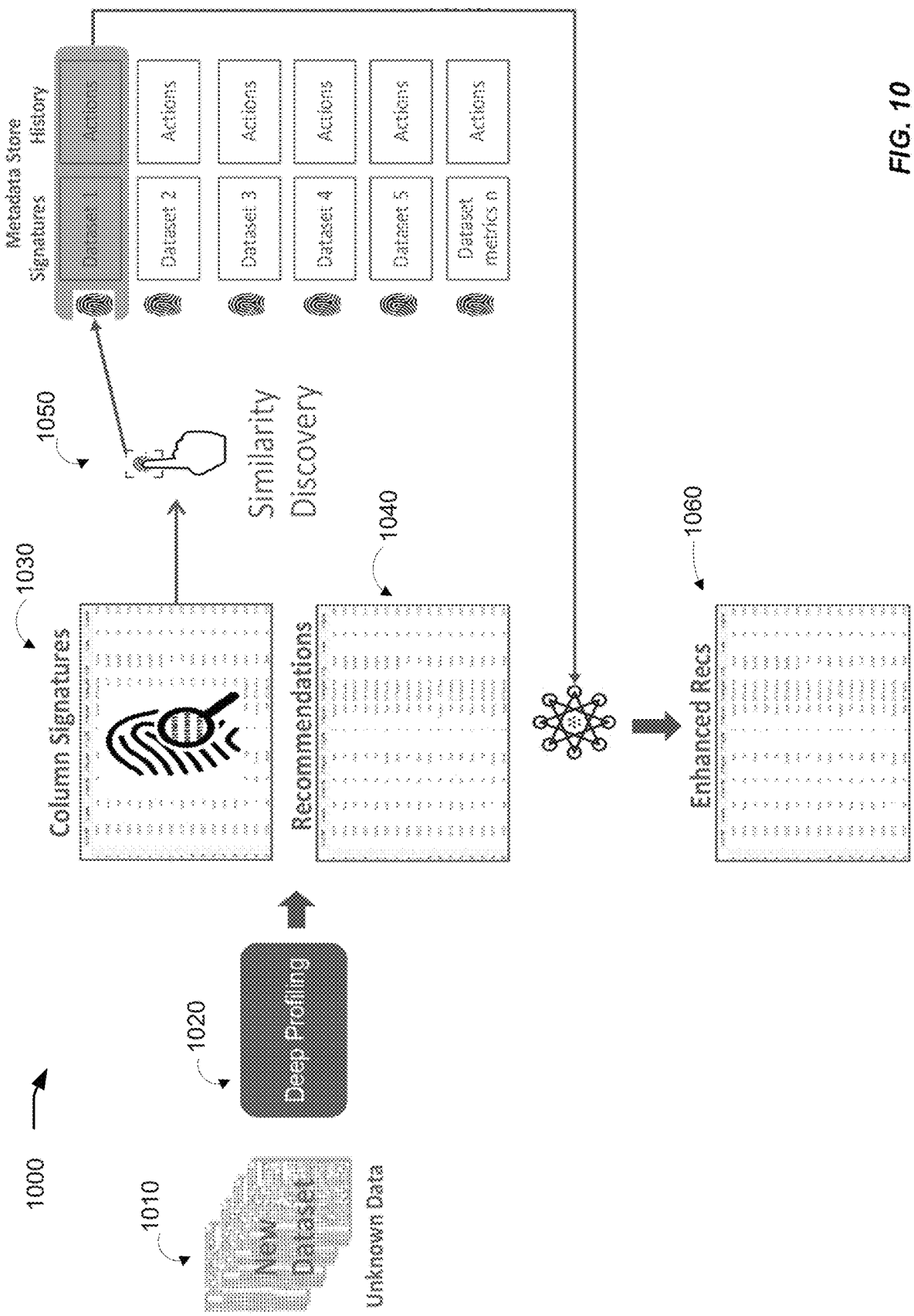
FIG. 10 illustrates an overview of a flow for providing enhanced recommendations, in accordance with some example embodiments.

FIG. 10 illustrates an overview of flow 1000 for providing enhanced recommendations, in accordance with some example embodiments.

At step 1010, a new data set is ingested. At step 1020, the data set is profiled. At step 1030, column level signature information is determined for the data sets. At step 1040, recommended actions for columns of data in the data set can be determined. At step 1050, it can be determined whether the new data set ingested in step 1010 includes similar data to that which has already been processed by the system and stored in the metadata store.

In response to determining that the new data set includes a column of data that is similar to a column of data in a data set that is stored in the metadata store, then, similar actions can be recommended for the new data set. For example, if it is determined that the new data set includes a column level signature that is similar to the first data set, then the recommendations that are provided for the new data set take into account the user history of actions that were applied to the first data set. Therefore, at step 1060 enhanced recommendations can be provided to a user.

Figure 11:
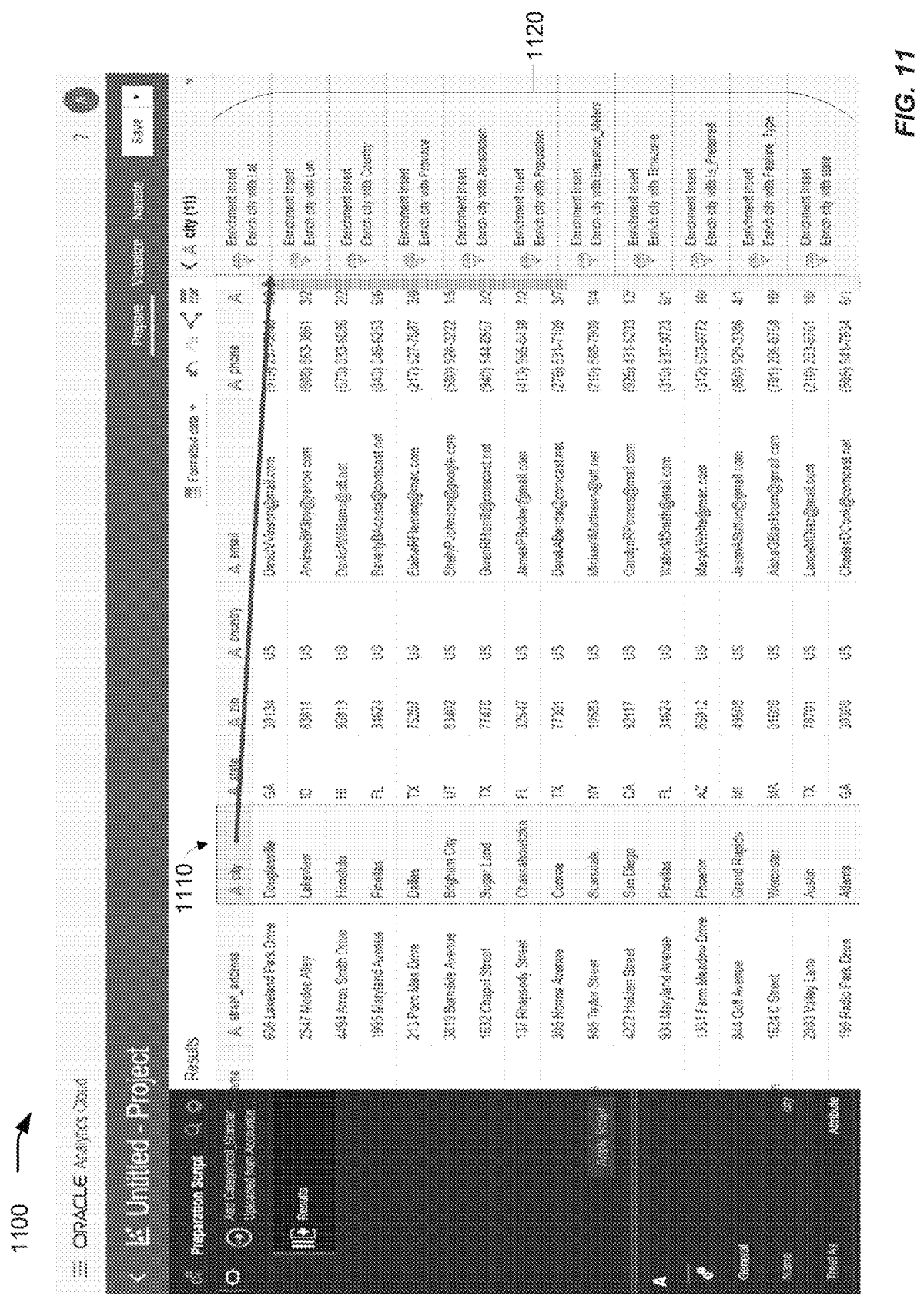

FIG. 11 illustrates a user interface 1100 displaying enrichment of a column of data in a data set, in accordance with some example embodiments.

In the example shown in FIG. 11, the system can determine that a column of data 1110, from a data set that is being profiled, corresponds with a city. Since the system determines that column of data corresponds to a city, actions list 1120 for enriching the city information can be provided to the user. The actions list 1120 of actions for enriching the city information can include longitude information, latitude information, country, province, jurisdiction, population, etc. Therefore, the city information can be enriched to include additional information that corresponds with the city.

The actions that are recommended to a user can be listed in order of relevance. Actions that are more likely to be accepted by the user can be placed higher on the recommended actions list than actions that are less likely to be accepted by the user. The order of relevance can be determined based on the user's history of actions that are accepted by the user.

Figure 12:
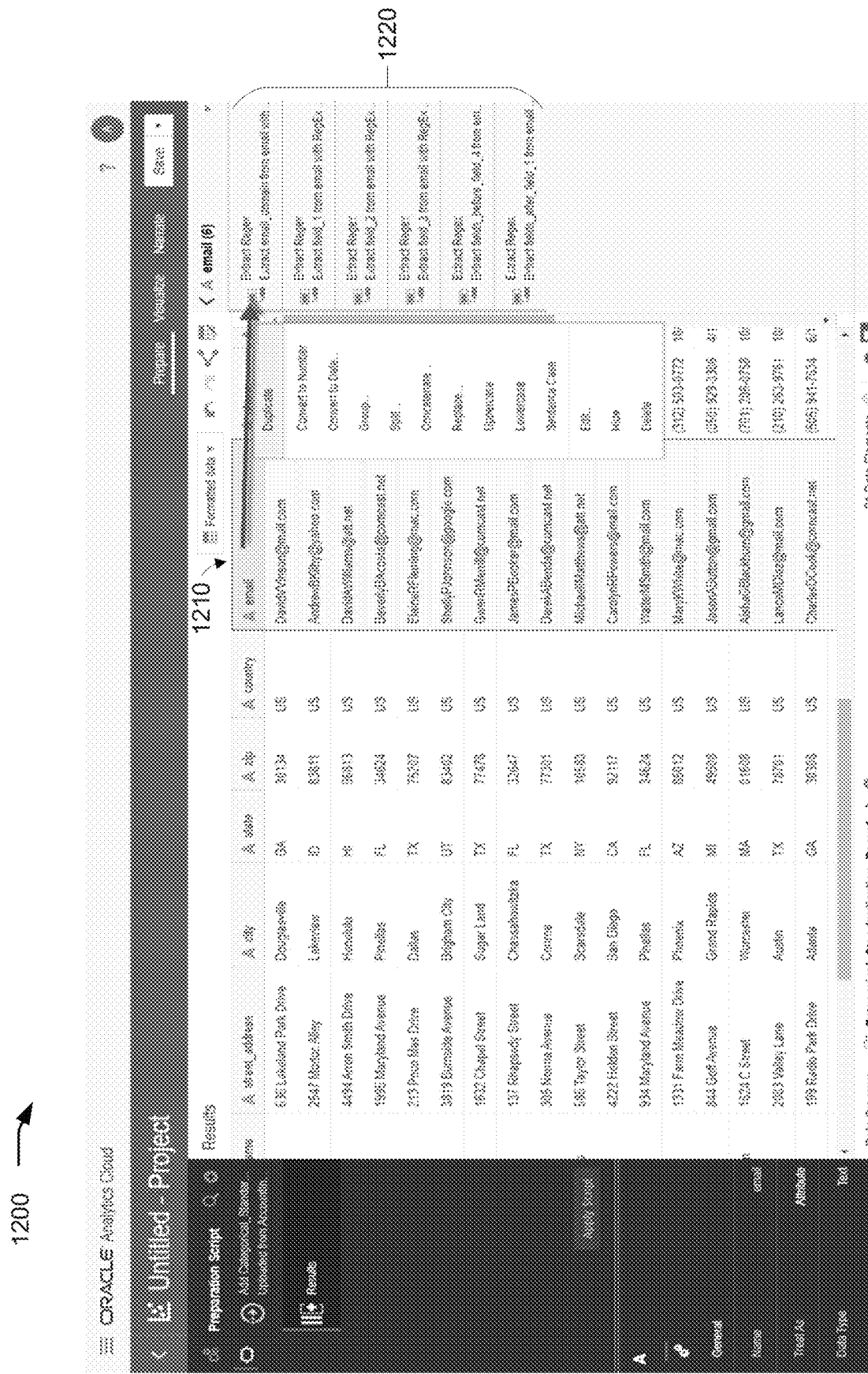
FIG. 12 illustrates a user interface displaying enrichment options for another column of data in the data set, in accordance with some example embodiments.

FIG. 12 illustrates a user interface 1200 displaying enrichment of another column of data in the data set, in accordance with some example embodiments.

In the example shown in FIG. 12, the system can determine that a column of data 2110, from a data set that is being profiled corresponds with an email address. Since the system determines that column of data corresponds to an email address, actions list 1220 for enriching the email information can be provided to the user. The actions list 1220 of actions for enriching the email information can include extracting the username, extracting the "@" symbol, extracting the domain information, and/or extracting the extension information from the email address.

The adaptive recommendation system can determine whether or not the user is applying the actions that are in the actions list. The system can also determine any manual actions that are entered by the user. For example, the system may determine that the user is changing the email address to be in lower case. When the system determines that the enrichment being performed by the user is changing the email address information to be in lower case, in the event email information is identified for any future data sets, and enrichment action that can be provided to the user can include changing the email address to lower case. Therefore, the amount of time required to enrich the data can decrease over time. The user will not be required to manually enter actions, and instead system can learn from the user's manual actions and can recommend such actions in future data sets.

Also an example embodiment further expedites the process of enriching data since the manual actions entered by the user can require multiple steps. An example embodiment can package all of the steps into one enrichment action. A user only needs to click once on be desired enrichment action listed in the actions list instead of entering multiple steps in order to achieve a desired action.

Figure 13:
FIG. 13 illustrates examples of actions configured to be applied to a column of data, in accordance with some example embodiments.

FIG. 13 illustrates examples of actions 1300 configured to be applied to a column of data, in accordance with some example embodiments. FIG. 13 generally illustrates a plurality of different actions that can be applied to a column of data. The enrichment recommendations shown in FIG. 13 are for a plurality of different types of columns of data. For example, recommended action 1310 can correspond to a column directed to a first and last name, recommended action 1320 can correspond to a column directed to a city, and recommended actions 1330 can correspond to a column directed to credit card information.

Figure 14:
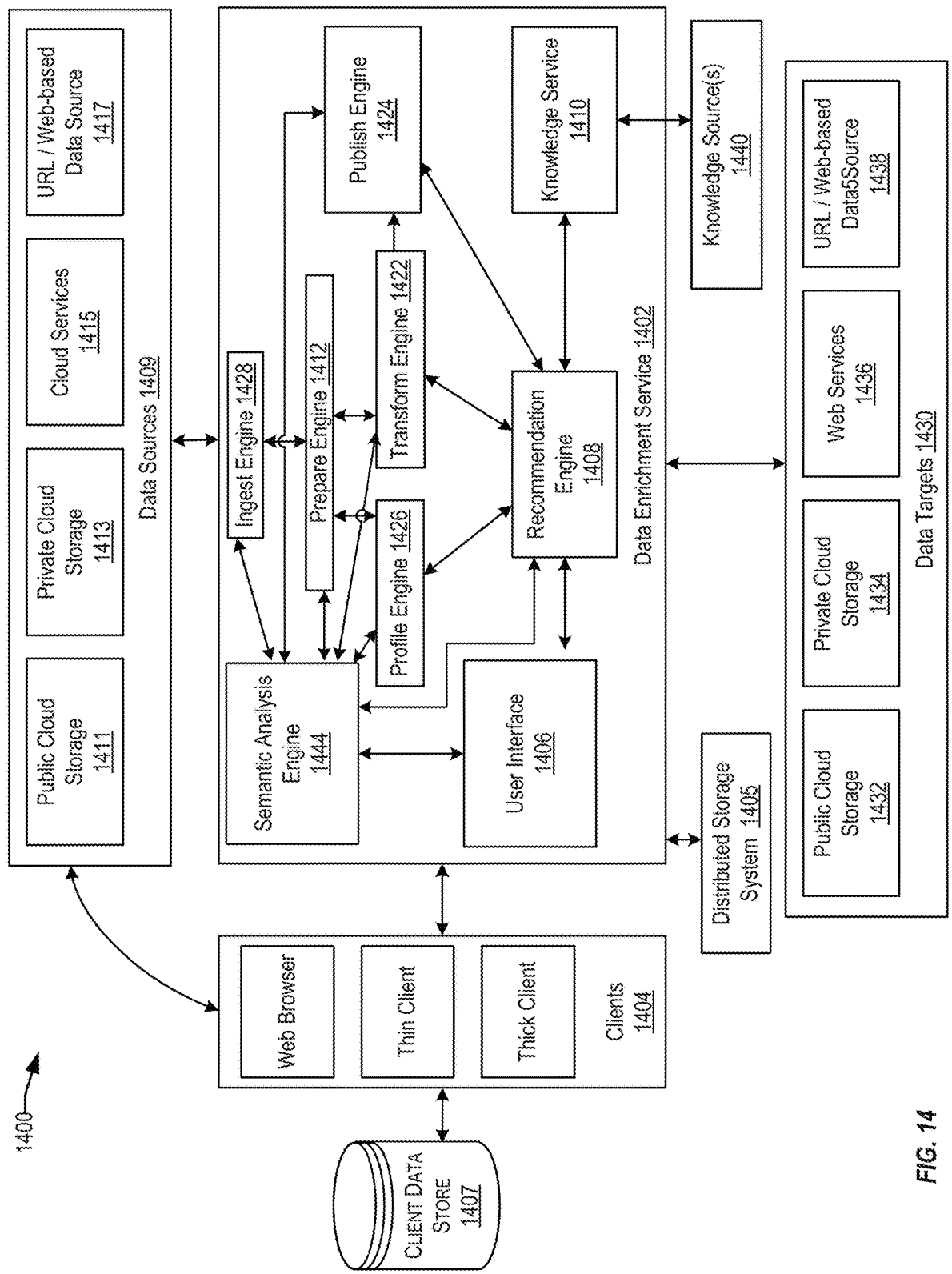
FIG. 14 illustrates a simplified block diagram of data enrichment system, in accordance with some example embodiments.

FIG. 14 illustrates a simplified block diagram of data enrichment system, in accordance with some example embodiments.

An example embodiment can provide an out-of-the-box knowledge service. Recommendations can be provided based on a column name or based on a column type. The column name or the column type can be identified by user. Alternatively, the column name and column type can be determined by the system.

Further, the example embodiments provide for user customization of the knowledge service. For example, customers can enhance the out-of-the-box knowledge service with their own reference data. Further, a customer can customize naming type the and enrichments that are performed on the data.

Also, in accordance with some example embodiments, the out of the box knowledge service can be expanded to include other capabilities. The other capabilities can be based on third-party reference sets. Further, recommendations can change based on user relevance feedback. For example, users can modify the suggestions that are provided to them. Future recommendations can be based on the changes to the recommendations made by the user, or based on recommendations selected by the user.

Data Enrichment System

FIG. 14 illustrates a simplified block diagram of data enrichment system 1400, in accordance with some example embodiments. The data enrichment system 1400 is configured to perform adaptive recommendations. Data enrichment system 1400 may implement a data enrichment service 1402. The data enrichment system 1400 can include the adaptive recommendation system 600. For example, the client data store 1407 can correspond to the data store 610 and metadata store 690. The ingest engine 1428 can correspond to the data ingestion engine 630. The recommendation engine 1408 can correspond to the recommendation engine 670. The profile engine 1426 can correspond to the profiler 630. Further, the user interface 1406 can correspond with the user interface 680.

Data enrichment service 1402 can receive data enrichment requests from one or more clients 1404. Data enrichment service 1402 may comprise one or more computers and/or servers. Data enrichment service 1402 may be a module that is comprised of several subsystems and/or modules, including some, which may not be shown. Data enrichment service 1402 may have more or fewer subsystems and/or modules than shown in the figure, may combine two or more subsystems and/or modules, or may have a different configuration or arrangement of subsystems and/or modules. In some embodiments, data enrichment service 1402 may include user interface 1406, ingest engine 1428, recommendation engine 1408, knowledge service 1410, profile engine 1426, transform engine 1422, a prepare engine 1412, publish engine 1424, and semantic analysis engine 1444. The elements implementing data enrichment service 1402 may operate to implement a semantic processing pipeline as described above.

Data enrichment system 1400 may include a semantic processing pipeline, in accordance with an embodiment of the present disclosure. All or part of the semantic processing pipeline may be implemented by data enrichment service. When a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 1402. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is described further below.

In some embodiments, data enrichment service 1402 may be provided by a computing infrastructure system (e.g., a cloud computing infrastructure system). The computing infrastructure system may be implemented in a cloud computing environment having one or more computing systems. The computing infrastructure system may be communicatively coupled, over one or more communication networks, to one or more data sources or one or more data targets such as those described herein.

The client's 1404 can include various client devices (such as desktop computers, laptop computers, tablet computers, mobile devices, etc.). Each client device can include one or more client applications 1404 through which the data enrichment service 1402 can be accessed. For example, a browser application, a thin client (e.g., a mobile app), and/or a thick client can execute on the client device and enable the user to interact with the data enrichment service 1402. The embodiment depicted in FIG. 14 is merely an example and is not intended to unduly limit the example embodiments. There may be more or fewer client devices than those shown in the figures.

The client devices 1404 may be of various different types, including, but not limited to personal computers, desktops, mobile or handheld devices such as a laptop, a mobile phone, a tablet, etc., and other types of devices. A communication network facilitates communications between client devices 1404 and data enrichment service 1402. The communication network can be of various types and can include one or more communication networks. Examples of a communication network can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network may include any communication network or infrastructure that facilitates communications between clients and data enrichment service 1402.

A user can interact with the data enrichment service 1402 through user interface 1406. Clients 1404 can render a graphical user interface to display the user's data, recommendations for transforming the user's data, and to send and/or receive instructions ("transformation instructions") to the data enrichment service 1402 through user interface 1406. The user interfaces may be rendered by data enrichment service 1402 or via clients 1404. For example, a user interface may be generated by user interface 1406, and rendered by data enrichment service 1402 at any one of clients 1404. A user interface may be provided by data enrichment system 1402 via network as part of a service (e.g., a cloud service) or a network-accessible application. In at least one example, an operator of a data enrichment service 1402 may operate one of clients 1404 to access and interact with any user interfaces disclosed herein. The user can send instructions to user interface 1406 to add data sources (e.g., provide data source access and/or location information, etc.).

Data enrichment service 1402 may ingest data using ingest engine 1428. Ingest engine 1428 can serve as an initial processing engine when a data source is added. The ingest engine 1428 can facilitate safe, secure, and reliable uploading of user data from one or more data sources 1409 into data enrichment service 1402. In some embodiments, ingestion engine 1428 can extract data from the one or more data sources 1409 and store it in a distributed storage system 1405 in data enrichment service 1402. Data ingested from one or more data sources 1409 and/or one or more clients 1404 can be processed and stored in a distributed storage system 1405. Data enrichment service 1402 can receive data from a client data store 1407 and/or from one or more data sources 1409. The distributed storage system 1405 can serve as temporary storage for the uploaded data during the remaining processing stages of the pipeline, prior to the data being published to one or more data targets 1430. Once an upload is complete, the prepare engine 1412 can be invoked to normalize the uploaded data set.

The received data may include structured data, unstructured data, or a combination thereof. Structure data may be based on data structures including, without limitation, an array, a record, a relational database table, a hash table, a linked list, or other types of data structures. As described above, the data sources can include a public cloud storage service 1411, a private cloud storage service 1413, various other cloud services 1415, a URL or web-based data source 1417, or any other accessible data source. A data enrichment request from the client 1404 can identify a data source and/or particular data (tables, columns, files, or any other structured or unstructured data available through data sources 1409 or client data store 1407). Data enrichment service 1402 may then access the identified data source to obtain the particular data specified in the data enrichment request. Data sources can be identified by address (e.g., URL), by storage provider name, or other identifier. In some embodiments, access to a data source may be controlled by an access management service. The client 1404 may display a request to the user to input a credential (e.g., username and password) and/or to authorize the data enrichment service 1402 to access the data source.

In some embodiments, data uploaded from the one or more data sources 1409 can be modified into various different formats. The prepare engine 1412 can convert the uploaded data into a common, normalized format, for processing by data enrichment service 1402. Normalizing may be performed by routines and/or techniques implemented using instructions or code, such as Apache Tika distributed by Apache®. The normalized format provides a normalized view of data obtained from the data source. In some embodiments, the prepare engine 1412 can read a number of different file types. Prepare engine 1412 can normalize the data into a character separated form (e.g., tab separated values, comma separated values, etc.) or as a JavaScript Object Notation (JSON) document for hierarchical data. In some embodiments, various file formats can be recognized and normalized. For example, standard file formats such as Microsoft Excel® formats (e.g., XLS or XLSX), Microsoft Word® formats (e.g., DOC or DOCX), and portable document format (PDF), and hierarchical formats like JSON and extended markup language (XML), can be supported. In some embodiments, various binary encoded file formats and serialized object data can also be read and decoded. In some embodiments, data can be provided to the pipeline in Unicode format (UTF-8) encoding. Prepare engine 1412 can perform context extraction and conversion to the file types expected by data enrichment service 1402, and can extract document level metadata from the data source.

Normalizing a data set may include converting raw data in a data set into a format that that can be processed by the data enrichment service 1402, in particular profile engine 1426. In one example, normalizing the data set to create a normalized data set includes modifying the data set having one format to an adjusted format as a normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates that can be processed by profile engine 1426. Data may be normalized by being modified or converted from a non-tabular format to a tabular format, having one or more columns of data.

Once the data has been normalized, the normalized data can be passed to profile engine 1426. The profile engine 1426 can perform a column by column analysis of normalized data to identify the types of data stored in the columns and information about how the data is stored in the columns. In this disclosure, although profile engine 1426 is described in many instances as performing operations on data, the data processed by profile engine 1426 has been normalized by prepare engine 1412. In some embodiments, the data processed by profile engine 1426 may include data that is not normalized for being in a format (e.g., a normalized format) that can be processed by profile engine 1426. The output, or results, of profile engine 1426 may be metadata (e.g., source profile) indicating profile information about the data from a source. The metadata may indicate one or more patterns about the data and/or a classification of the data. As further described below, the metadata may include statistical information based on analysis of the data. For example, profile engine 1426 can output a number of metrics and pattern information about each identified column, and can identify schema information in the form of names and types of the columns to match the data.

The metadata generated by profile engine 1426 may be used by other elements of data enrichment service, e.g., recommendation engine 1408 and transformation engine 1422, to perform operations as described herein for data enrichment service 1402. In some embodiments, the profile engine 1426 can provide metadata to a recommendation engine 1408.

Recommendation engine 1408 can identify repair, transform, and data enrichment recommendations for the data processed by profile engine 1426. The metadata generated by profile engine 1426 can be used to determine recommendations for data based on the statistical analysis and/or classifications indicated by the metadata. In some embodiments, recommendations can be provided to the user through a user interface or other web service. Recommendations can be tailored to business users, such that the recommendations describe at a high level what data repairs or enrichments are available, how those recommendations compare to past user activity, and/or how unknown items can be classified based on existing knowledge or patterns. Knowledge service 1410 can access one or more knowledge graphs or other knowledge sources 1440. The knowledge sources can include publicly available information published by web sites, web services, curated knowledge stores, and other sources. Recommendation engine 1408 can request (e.g., query) knowledge service 1410 for data that can be recommended to a user for the data obtained for a source.

In some embodiments, transform engine 1422 can present the user with the sampled data for each column, or sample rows from the input data set through user interface 1406. Through user interface 1406, data enrichment service 1402 may present a user with recommended transformations. The transformations may be associated with transformation instructions, which may include code and/or function calls to perform transformation actions. The transformation instructions may be invoked by a user based on selection at user interface 1406, such as by selecting a recommendation for transformation or by receiving input indicating an operation (e.g., an operator command). In one example, transformation instructions include a transformation instruction to rename at least one column of data based on the entity information. A further transformation instruction can be received to rename the at least one column of data to a default name. A default name may include a name that is pre-determined. A default name may be any name that is pre-defined when a name for a column of data cannot be determined or is not defined. The transformation instructions can include a transformation instruction to reformat at least one column of data based on the entity information, and a transformation instruction to obfuscate at least one column of data based on the entity information. In some embodiments, the transformation instructions can include an enrichment instruction to add one or more columns of data obtained from the knowledge service based on the entity information.

Through user interface 1406, a user can perform transform actions, and the transform engine 1422 can apply them to the data obtained from a data source and display the results. This gives the user immediate feedback that can be used to visualize and verify the effects of the transform engine 1422 configuration. In some embodiments, the transform engine 1422 can receive pattern and/or metadata information (e.g., column names and types) from profile engine 1426 and recommendation engine 1408, which provides recommended transform actions. In some embodiments, transform engine 1422 can provide a user event model that orchestrates and tracks changes to the data to facilitate undo, redo, delete, and edit events. The model can capture dependencies between actions so that the current configuration is kept consistent. For example, if a column is removed, then recommended transform actions provided by the recommendation engine 1408 for that column can also be removed. Similarly, if a transform action results in inserting new columns and that action is deleted, then any actions performed on the new columns are also deleted.

As described above, during processing the received data can be analyzed and a recommendation engine 1408 can present one or more recommended transforms to be made to the data, including enrichment, repair, and other transforms. A recommended transform for enriching data may be comprised of a set of transforms, each transform of which is a single transform action, or an atomic transformation, performed on the data. A transform may be performed on data that was previously transformed by another transform in the set. The set of transforms may be performed in parallel or in a particular order, such that the data resulting after performing the set of transforms is enriched. The set of transforms may be performed according to a transform specification. The transform specification may include transformation instructions that indicate how and when to perform each of the set of transforms on the data produced by profile engine 1426 and the recommendation for enriching the data determined by recommendation engine 1408. Examples of the atomic transformation may include, without limitation, transforms to headers, conversions, deletions, splits, joins, and repairs. The data that is transformed according to the set of transforms may undergo a series of changes, each of which results in intermediate data the data is enriched. The data generated for intermediate steps for the set of transforms may be stored in a format such as an Resilient Distributed Dataset (RDD), text, a data record format, a file format, any other format, or a combination thereof.

In some embodiments, the data generated as a result of the operations performed by any elements of data enrichment service 1402 may be stored in an intermediary data format including, but not limited to, RDD, text, a document format, any other type of format, or a combination thereof. The data stored in the intermediary format may be used to further perform operations for data enrichment service 1402.

The following tables illustrate examples of transformations. Table 1 shows an outline of types of transforms actions.

TABLE 1

| Transform Types | Function Parameter(s) | Description | Examples |
|---|---|---|---|
| Update | String => String | Update column values | Obfuscate, date format, |
| Split | String => Array[String] | Split a column's values into new columns | Regex split, delimiter split |
| Filter | String => Boolean | Filter rows based on a single column's values | White list filtering, date range filtering |
| Multi-column Filter | Array[String] => Boolean | Filter rows based on multiple column values | NER false positives filtering |
| Edit Columns | Array[String] => Array[String] | Edit the existing columns | Reorder, remove, swap columns |
| Extract | (String, String) => Array[Array[String]] | Extract values from a column into a new RDD | NER with results extracted to a new table |
| Insert | String => Array[String] | Insert new columns | Insert timestamp |
| Insert 1:M | String => Array[Array[String]] | Insert new columns in a one-to-many way | Insert NER results |

Table 2 shows transform actions that do not fit within the category types shown with reference to Table 1.

TABLE 2

| Transform Actions | Description |
|---|---|
| Rename column | Rename a column |
| Sample | Replace the current RDD with a sample of it |
| Join | Performs a left-outer-join between two RDDs |
| Export | Export an RDD as columnar data to e.g. HDFS |

Table 3 below shows examples of types of transform examples. Specifically Table 3 shows examples of transform actions and describes the type of transformations corresponding to those actions. For example, a transform action may include filtering data based on detecting the presence of words from a white list in data. If a user wants to track communications (e.g., tweets) containing "Android" or "iPhone", a transform action could be added with those two words comprising the provided white list. This is just one example of the way by which data could be enriched for a user.

| Transform Actions | Description | Input | Output | RI |
|---|---|---|---|---|
| Obfuscate | Obfuscate sensitive information such as e.g. credit card numbers, ID's, or birth dates | 123-45-6789 | ###-##-#### | Y |
| Date Reformat | Reformat a column containing a date | 1330978536 Mar. 12, 2012 14:13:49 | Mar. 5, 2012 Mar. 12, 2012 02:13:49 PM | Y |
| Rename Column | Rename a column | tagged_0001 text_label_0005 | user_agent call_letters | Y |
| NER | Perform named entity recognition and insert values (see next section) | PopBooth turns your iPhone or iPad into a photo booth, prints and all | Type: Product Text: PopBooth, iPhone, iPad | Y |
| Search/Replace | Perform search and replace on a column's values | Search: Mozilla Replace: Godzilla Value: Mozilla 5.0 | Value: Godzilla 5.0 | Y |
| Change case | Change the case to lower, upper, or proper | Case: Proper Value: eden prairie | Value: Eden Prairie | Y |
| White list filter | Filter rows based on the presence of words from a white list in a text-valued column | List: Android, iPhone Value: I heart my iPhone Table 3 | Keep all rows whose values contain "Android" or "iPhone" | Y |

The recommendation engine 1408 can use information from a knowledge service 1410, knowledge source 1440 to generate recommendations for transform engine 1422 and to instruct transform engine 1422 to generate transform scripts that will transform the data. Transform scripts may include programs, code, or instructions that may be executable by one or more processing units to transform received data. As such, the recommendation engine 1408 can serve as an intermediary between the user interface 1406 and the knowledge service 1410.

As discussed above, profile engine 1426 can analyze data from a data source to determine whether any patterns exist, and if so, whether a pattern can be classified. Once data obtained from a data source is normalized, the data may be parsed to identify one or more attributes or fields in the structure of the data. Patterns may be identified using a collection of regular expressions, each having a label ("tag") and being defined by a category. The data may be compared to different types of patterns to identify a pattern. Examples of pattern types that can be identified include, without limitation, integers, decimals, dates or date/time strings, URLs, domain addresses, IP addresses, email addresses, version numbers, locale identifiers, UUIDs and other hexidecimal identifiers, social security numbers, US box numbers, typical US street address patterns, zipcodes, US phone numbers, suite numbers, credit card numbers, proper names, personal information, and credit card vendors.

In some embodiments, profile engine 1426 may identify patterns in data based on a set of regular expressions defined by semantic constraints or syntax constraints. A regular expression may be used to determine the shape and/or structure of data. Profile engine 1426 may implement operations or routines (e.g., invoke an API for routines that perform processing for regular expressions) to determine patterns in data based on one or more regular expressions. For example, a regular expression for a pattern may be applied to data based on syntax constraints to determine whether the pattern is identifiable in the data.

Profile engine 1426 may perform parsing operations using one or more regular expressions to identify patterns in data processed by profile engine 1426. Regular expressions may be ordered according to a hierarchy. Patterns may be identified based on order of complexity of the regular expressions. Multiple patterns may match data that is being analyzed; the patterns having the greater complexity will be selected. As described further below, profile engine 1426 may perform statistical analysis to disambiguate between patterns based on the application of regular expressions that are applied to determine those patterns.

In some embodiments, data that is unstructured may be processed to analyze metadata-describing attributes in the data. The metadata itself may indicate information about the data. The metadata may be compared to identify similarities and/or to determine a type of the information. The information identified based on the data may be compared to know types of data (e.g., business information, personal identification information, or address information) to identify the data that corresponds to a pattern.

In accordance with an embodiment, the profile engine 1426 may perform statistical analysis to disambiguate the patterns and/or the text in data. Profile engine 1426 may generate metadata including statistical information based on the statistical analysis. When patterns are identified, profile engine 1426 may determine statistical information (e.g., a pattern metric) about each different pattern to disambiguate between the patterns. The statistical information may include a standard deviation for different patterns that are recognized. The metadata including the statistical information can be provided to other components of data enrichment service 1402, such as recommendation engine 1408. For example, the metadata may be provided to recommendation engine 1408 to enable recommendation engine 1408 to determine recommendations for enrichment of the data based on the identified the pattern(s). Recommendation engine 1408 can use the patterns to query a knowledge service 1410 to obtain additional information about the patterns. Knowledge service 1410 can include or have access to one or more knowledge sources 1440. A knowledge sources can include publicly available information published by web sites, web services, curated knowledge stores, and other sources.

Profile engine 1426 may perform the statistical analysis to disambiguate between patterns identified in the data. For example, data analyzed by profile engine 1426, may be evaluated to compute a pattern metric (e.g., a statistical frequency of different patterns in the data) for each of the different patterns identified in the data. Each of the set of pattern metrics is computed for a different pattern of the patterns that are identified. Profile engine 1426 may determine a difference amongst the pattern metrics computed for the different patterns. One of the identified patterns may be selected based on the difference. For example, one pattern may be disambiguated from another pattern based on a frequency of the patterns in the data. In another example, where the data consists of dates having multiple different formats, each corresponding to a different pattern, profile engine 1426 may convert the dates to a standard format in addition to normalization and may then determine a standard deviation for each format from different patterns. In this example, profile engine 1426 may statistically disambiguate between the formats in the data as having the format with the lowest standard deviation. The pattern corresponding to the format of the data having the lowest standard deviation may be selected as the best pattern for the data.

Profile engine 1426 may determine a classification of a pattern that it identifies. Profile engine 1426 may communicate with knowledge service 1410 to determine whether the identified pattern can be classified within a knowledge domain. Knowledge service 1410 may determine one or more possible domains associated with the data based on techniques described herein such as matching techniques and similarity analysis. Knowledge service 1410 may provide profile engine 1426 with a classification of one or more domains possibly similar to data identified with a pattern. Knowledge service 1410 may provide, for each of the domains identified by knowledge service 1410, a similarity metric indicating a degree of similarity to the domain. The techniques disclosed herein for similarity metric analysis and scoring can be applied by recommendation engine 1408 to determine a classification of data processed by profile engine 1426. The metadata generated by profile engine 1426 may include information about the knowledge domain, if any are applicable, and a metric indicating a degree of similarity with the data analyzed by profile engine 1426.

Profile engine 1426 may perform statistical analysis to disambiguate text identified in data, regardless of whether patterns are identified in the data. The text may be part of a pattern, and the analysis of the text may be used to further identify a pattern, if any can be identified. Profile engine 1426 may request knowledge service 1410 to perform domain analysis on text to determine whether the text can be classified into one or more domains. Knowledge service 1410 may operate to provide information about one or more domains that are applicable to the text being analyzed. Analysis performed by knowledge service 1410 to determine a domain may be performed using techniques described herein, such as similarity analysis used to determine a domain for data.

In some embodiments, profile engine 1426 may identify text data in a data set. The text data may correspond to each entity identified in the set of entities. A classification may be determined for each entity that is identified. Profile engine 1426 may request knowledge service to identify a classification for the entity. Upon determining a set of classifications for a set of entities (e.g., entities in a column), profile engine 1426 may compute a set of metrics ("classification metrics") to disambiguate between the set of classifications. Each of the set of metrics may be computed for a different one of the set of classifications. Profile engine 1426 may statistically disambiguate the set of metrics by comparing them to each other to determine which classification most closely represents the set of entities. A classification of the set of entities may be chosen based on the classification that represents the set of entities.

Using the knowledge sources 1440, knowledge service 1410 can match, in context, the patterns identified by profile engine 1426. Knowledge service 1410 may compare the identified patterns in the data or the data if in text to entity information for different entities stored by a knowledge source. The entity information may be obtained from one or more knowledge sources 1440 using knowledge service 1410. Examples of known entity may include social security numbers, telephone numbers, address, proper names, or other personal information. The data may be compared to entity information for different entities to determine if there is a match with one or more entities based on the identified pattern. For example, the knowledge service 1410 can match the pattern "XXX-XX-XXXX" to the format of U.S. social security numbers. Furthermore, the knowledge service 1410 can determine that social security numbers are protected or sensitive information, the disclosure of which is linked to various penalties.

In some embodiments, profile engine 1426 can perform statistical analysis to disambiguate between multiple classifications identified for data processed by profile engine 1426. For example, when text is classified with multiple domains, profile engine 1426 can process the data to statistically determine the appropriate classification determined by knowledge service 1410. The statistical analysis of the classification can be included in the metadata generated by profile engine 1426.

In addition to pattern identification, profile engine 1426 can analyze data statistically. The profile engine 1426 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

The metadata produced by profile engine 1426 can be provided to the recommendation engine 1408 to generate one or more transform recommendations. The entities that match an identified pattern of the data can be used to enrich the data with those entities identified by classification determined using knowledge service 1410. In some embodiments, the data to the identified patterns (e.g., city and state) may be provided to knowledge service 1410 to obtain, from a knowledge source 1440, entities that match the identified patterns. For example, knowledge service 1410 may be invoked calling a routine (e.g., getCities( ) and getStates( )) corresponding to the identified patterns to receive entity information. The information received from knowledge service 1410 may include a list (e.g., canonical list) of entities that have properly spelled information (e.g., properly spelled cities and states) for the entities. Entity information corresponding to matching entities obtained from knowledge service 1410 can be used to enrich data, e.g., normalize the data, repair the data, and/or augment the data.

In some embodiments, the recommendation engine 1408 can generate transform recommendations based on the matched patterns received from the knowledge service 1410. For example, for the data including social security numbers, the recommendation engine can recommend a transform that obfuscates the entries (e.g., truncating, randomizing, or deleting, all or a portion of the entries). Other examples of transformation may include, reformatting data (e.g., reformatting a date in data), renaming data, enriching data (e.g., inserting values or associating categories with data), searching and replacing data (e.g., correcting spelling of data), change case of letter (e.g., changing a case from upper to lower case), and filter based on black list or white list terms. In some embodiments, recommendations can be tailored for particular users, such that the recommendations describe at a high level what data repairs or enrichments are available. For example, an obfuscation recommendation may indicate that the first five digits of the entries will be deleted. In some embodiments, the recommendations can be generated based on past user activity (e.g., provide a recommended transform that was previously used when sensitive data was identified)

Transform engine 1422 can generate transform scripts based on the recommendations provided by recommendation engine 1408 (e.g., a script to obfuscate the social security numbers). A transform script may perform an operation to transform data. In some embodiments, a transform script may implement a linear transformation of data. A linear transformation may be implemented through use of an API (e.g., Spark API). The transform actions may be performed by operations invoked using the API. A transform script may be configured based on transform operations defined using the API. The operations may be performed based on the recommendations.

In some embodiments, the transform engine 1422 can automatically generate transform scripts to repair data at the data source. Repairs may include automatically renaming columns, replacing strings or patterns within a column, modifying text case, reformatting data, etc. For example, the transform engine 1422 can generate a transformation script to transform a column of dates based on a recommendation from recommendation engine 1408 to modify, or convert, the formats of the dates in the column. The recommendation may be selected from multiple recommendations to enrich or modify the data from a data source that is processed by profile engine 1426. The recommendation engine 1408 may determine the recommendation based on metadata, or profile, provided by the profile engine 1426. The metadata may indicate a column of dates identified for different formats (e.g., MM/DD/YYYY, DD-MM-YY, etc.). The transform script generated by transform engine 1422 can, for example, split and/or join columns based on suggestions from the recommendation engine 1408. The transform engine 1422 may also remove columns based on the data source profiles received from profile engine 1426 (e.g., to remove empty columns, or columns that include information that is not desired by the user).

A transform script may be defined using a syntax that describes operations with respect to one or more algorithms (e.g., Spark Operator Trees). As such, the syntax may describe operator-tree transduction/reduction. A transform script may be generated based on a chosen recommendation or requested by a user interactively through a graphical user interface. Based on the transform operations specified by a user through the graphical user interface, the transform engine 1422 performs transform operations according to those operations. The transform operations may be recommended to the user to enrich a data set.

As described further below, the client's 1404 can display recommendations describing or otherwise indicating each recommended transform. When a user selects a transform script to be run, the selected transform script can be run on all or more of the data from the data source in addition to the data analyzed to determine the recommended transform(s). The resulting transformed data can then be published to one or more data targets 1430 by publish engine 1424. In some embodiments, the data targets can be different data stores than the data sources. In some embodiments, the data targets can be the same data stores as the data sources. Data targets 1430 can include a public cloud storage service 1432, a private cloud storage service 1434, various other cloud services 1436, a URL or web-based data target 1438, or any other accessible data target.

In some embodiments, recommendation engine 1408 can query knowledge service 1410 for additional data related to the identified platform. For example, where the data includes a column of city names, related data (e.g., location, state, population, country, etc.) can be identified and a recommendation to enrich the data set with the related data can be presented.

Knowledge service 1410 can implement a matching method to compare the data to reference data available through knowledge service 1410. Knowledge service 1410 can include or have access to one or more knowledge sources 1440. The knowledge sources can include publicly available information published by web sites, web services, curated knowledge stores, and other sources. Knowledge service 1410 can implement a method to determine the semantic similarity between two or more data sets. This may also be used to match the user's data to reference data available through the knowledge service 1410. Knowledge service 1410 may perform similarity metric analysis as described in this disclosure. The techniques performed by knowledge service 1410 may include those described in this disclosure including the techniques described by the references incorporated herein.

Knowledge service 1410 can perform operations to implement automated data analyses. In some embodiments, knowledge service 1410 can use an unsupervised machine learning tool, such as Word2Vec, to analyze an input data set. Word2Vec can receive a text input (e.g., a text corpus from a large data source) and generate a vector representation of each input word. The resulting model may then be used to identify how closely related are an arbitrary input set of words. For example, a Word2Vec model built using a large text corpus (e.g., a news aggregator, or other data source) can be utilized to determine corresponding numeric vector for each input word. When these vectors are analyzed, it may be determined that the vectors are "close" (in the Euclidean sense) within a vector space. Although this can identify that input words are related (e.g., identifying input words that are clustered closely together within a vector space), Word2Vec may not be usable to identify a descriptive label for the words (e.g., "tire manufacturers"). Knowledge service 1410 may implement operations to categorize the related words using a curated knowledge source 1440 (e.g., YAGO, from the Max Planck Institute for Informatics). Using information from a knowledge source 1440, knowledge service 1410 can add additional, related data to the input data set.

In some embodiments, knowledge service 1410 may implement operations to perform trigram modeling to further refine categorization of related terms. Trigram modeling can be used to compare sets of words for category identification. The input data set can be augmented with the related terms.

Using the input data set, which may include added data, knowledge service 1410 can implement matching methods (e.g., a graph matching method) to compare the words from the augmented data set to categories of data from knowledge source 1440. Knowledge service 1410 can implement a method to determine the semantic similarity between the augmented data set and each category in knowledge source 1440 to identify a name for the category. The name of the category may be chosen based on a highest similarity metric. The similarity metric may computed be based on the number of terms in the data set that match a category name. The category may be chosen based on the highest number of terms matching based on the similarity metric. Techniques and operations performed for similarity analysis and categorization are further described below.

In some embodiments, knowledge service 1410 can augment an input data set and use information from a knowledge source 1440 to add additional, related data to the input data set.

For example, a data analysis tool such as Word2Vec can be used to identify semantically similar words to those included in the input data set from a knowledge source, such as a text corpus from a news aggregation service. In some embodiments, knowledge service 1410 can implement trigram modeling to preprocess data obtained from a knowledge source 1440 (such as YAGO) to generate an indexed table of words by category. Knowledge service 1410 can then create trigrams for each word in the augmented data set and match the word to a word from the indexed knowledge source 1440.

Using the augmented data set (or the trigram matched augmented data set), knowledge service 1410 can compare the words from the augmented data set to categories of data from knowledge source 1440. For example, each category of data in the knowledge source 1440 can be represented as a tree structure, with the root node representing the category, and each leaf node representing a different word belonging to that category. Knowledge service 1410 can implement a method (e.g., Jaccard index, or other similarity metric) to determine the semantic similarity between the augmented data set and each category in knowledge source 1410. The name of the category that matches the augmented data set (e.g., having a highest similarity metric) can then be applied as a label to the input data set.

In some embodiments, knowledge service 1410 can determine the similarity of two data sets A and B, by determining the ratio of the size of the intersection of the data sets to the size of the union of the data sets. For example, a similarity metric may be computed based on the ratio of 1) the size of the intersection of an data set (e.g., an augmented data set) and a category and 2) the size of their union. The similarity metric may be computed for comparison of a data set and a category as indicated above. As such, a "best match" may be determined based on comparing the similarity metrics. The data set used for the comparison may be enriched by being augmented with a label corresponding to the category for which the best match is determined using the similarity metric.

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sorensen index; the Tversky index; the Tanimoto metric; and the cosine similarity metric.

In some embodiments, knowledge service 1410 may utilize a data analysis tool, such as Word2Vec, to compute a refined metric (e.g., score) that indicates a degree of match between data from a knowledge source 1440 and an input data, which may be augmented with data from a knowledge source. The score ("knowledge score") may provide greater knowledge about the degree of similarity between an input data set and a category to which a comparison is made. The knowledge score may enable data enrichment service 1402 to choose a category name that bests represents the input data.

In the techniques described above, knowledge service 1410 may count the number of matches of terms in the input data set to a candidate category (e.g., genus) name in a knowledge source 1440. The result of the comparison may yield a value that represents a whole integer. As such the value, although indicative of the degree of match between terms, may not indicate a degree of match between an input data set and different terms in a knowledge source.

Knowledge service 1410 may utilize Word2Vec to determine a similarity of a comparison of each term (e.g., a term for a genus) in a knowledge source and the terms of input data (e.g., species). Using Word2Vec, knowledge service 1410 can compute a similarity metric (e.g., cosine similarity or distance) between an input data set and one or more terms obtained from a knowledge source. The cosine similarity may be computed as the cosine angle between a data set of terms (e.g., a domain or genus) obtained from a knowledge source and an input data set of terms. The cosine similarity metric may be computed in a manner similar to the Tanimoto metric. By computing a similarity metric based on a cosine similarity, each term in the input data set may be considered as a faction of a whole-value integer, such as a value indicating a percentage of similarity between the term and candidate category. For example, computing a similarity metric between a tire manufacturer and a surname might result in a similarity metric of 0.3, while the similarity metric between a tire manufacturer and a company name might results in a similarity metric of be 0.5. Non-whole integer values representing similarity metrics can be close compared to provide greater accuracy for a closely matching category name. The closely matching category name may be chosen as the most applicable category name based on the similarity metric closest to a value of 1. In the example, above, based on the similarity metric, company name is more likely the correct category. As such, knowledge service 1410 can associated "company" instead of "surname" with a user-supplied column of data containing tire manufactures.

Knowledge service 1410 can determine information about knowledge groups (e.g., domains or categories). Information about knowledge groups can be presented in a graphical user interface. Information about knowledge domains may include a metric (e.g., a knowledge score) indicating a measure of similarity between a knowledge domain and an input data set of terms. Input data may be compared to data from a knowledge source 1440. An input data set may correspond to a column of data of a data set specified by a user. The knowledge score may indicate a measure of similarity between an input data set and one or more terms provided by a knowledge source, each term corresponding to a knowledge domain. The column of data may include terms that potentially belong to knowledge domain.

In at least one embodiment, knowledge service 1410 may determine a more accurate matching score. The score may correspond to a value computing using a scoring formula using techniques disclosed herein including references that are incorporated herein. The scoring formula may determine a semantic similarity between two data sets, e.g., the input data set and terms in a domain (e.g., a candidate category) obtained from a knowledge source. The domain for which the matching score indicates the best match (e.g., the highest matching score), may be chosen as the domain having the greatest similarity with the input data set. As such, the terms in the input data set may be associated with the domain name as the category.

The scoring formula may be applied to an input data set and a domain (e.g., a category of terms obtained from a knowledge source) to determine a score that indicates a measure of a match between the input data and the domain. The domain may have one or more terms, which collectively define the domain. The score may be used to determine the domain to which an input data set is most similar. The input data set may be associated with a term descriptive of the domain to which the input data set is most similar.

In some embodiments, user interface 1406 can generate one or more graphical visualizations based on metadata provided by profile engine 1426. As explained above, the data provided by profile engine 1426 may include statistical information indicating metrics about data that has been processed by profile engine 1426. A graphical visualization can include a graphical dashboard (e.g., a visualization dashboard). The graphical dashboard may indicate a plurality of metrics, each of the plurality of metrics indicating a real time metric of the data relative to a time that the data is profiled. A graphical visualization may be displayed in a user interface. For example, the graphical visualization that is generated may be sent to a client device to cause the client device to display the graphical visualization in a user interface at the client device. In some embodiments, a graphical visualization may provide profiling results.

Additionally, the structural analyses by the profile engine 1426 enable the recommendation engine to better focus its queries to knowledge service 1410, improving processing speed and reducing load on system resources. For example, this information can be used to limit the scope of knowledge being queried so that the knowledge service 1410 does not attempt to match a column of numerical data to place names.

Semantic analysis engine 1444 can process and analyze an input data set. The input data set may be based on a text corpus from a large data source. The input data set may be obtained from multiple data sources. The data sets may be processed as ingested from data sources, and/or may be processed after processing performed by any elements of data enrichment service 1402. Semantic analysis engine 1444 may include one or more components to perform processing on a data set from a data source to determine semantic analysis using techniques disclosed herein. The results of semantic analysis may be visualized using techniques disclosed herein.

Computer System

Figure 15:
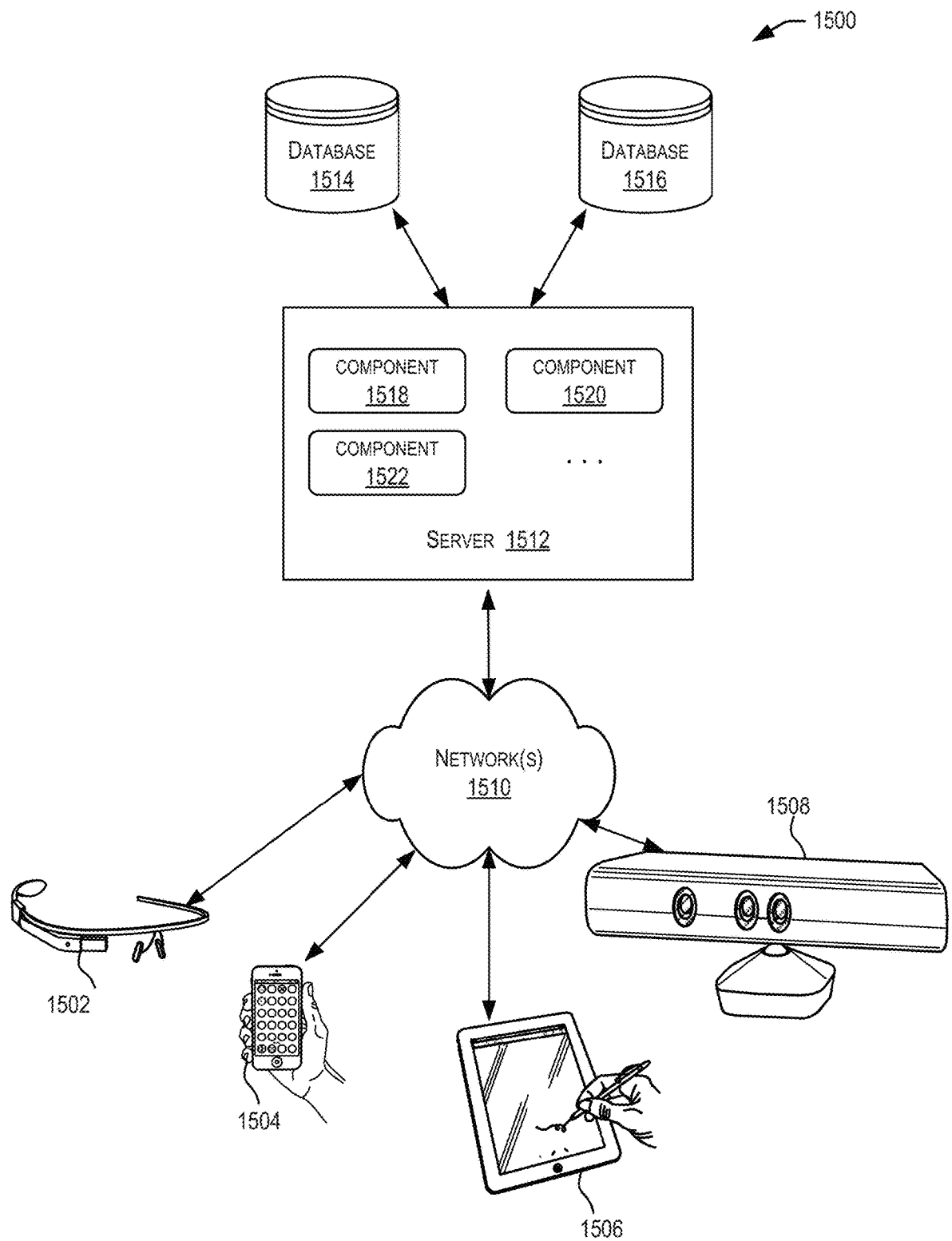
FIG. 15 illustrates a simplified diagram of a distributed system for implementing some example embodiments.
Figure 16:
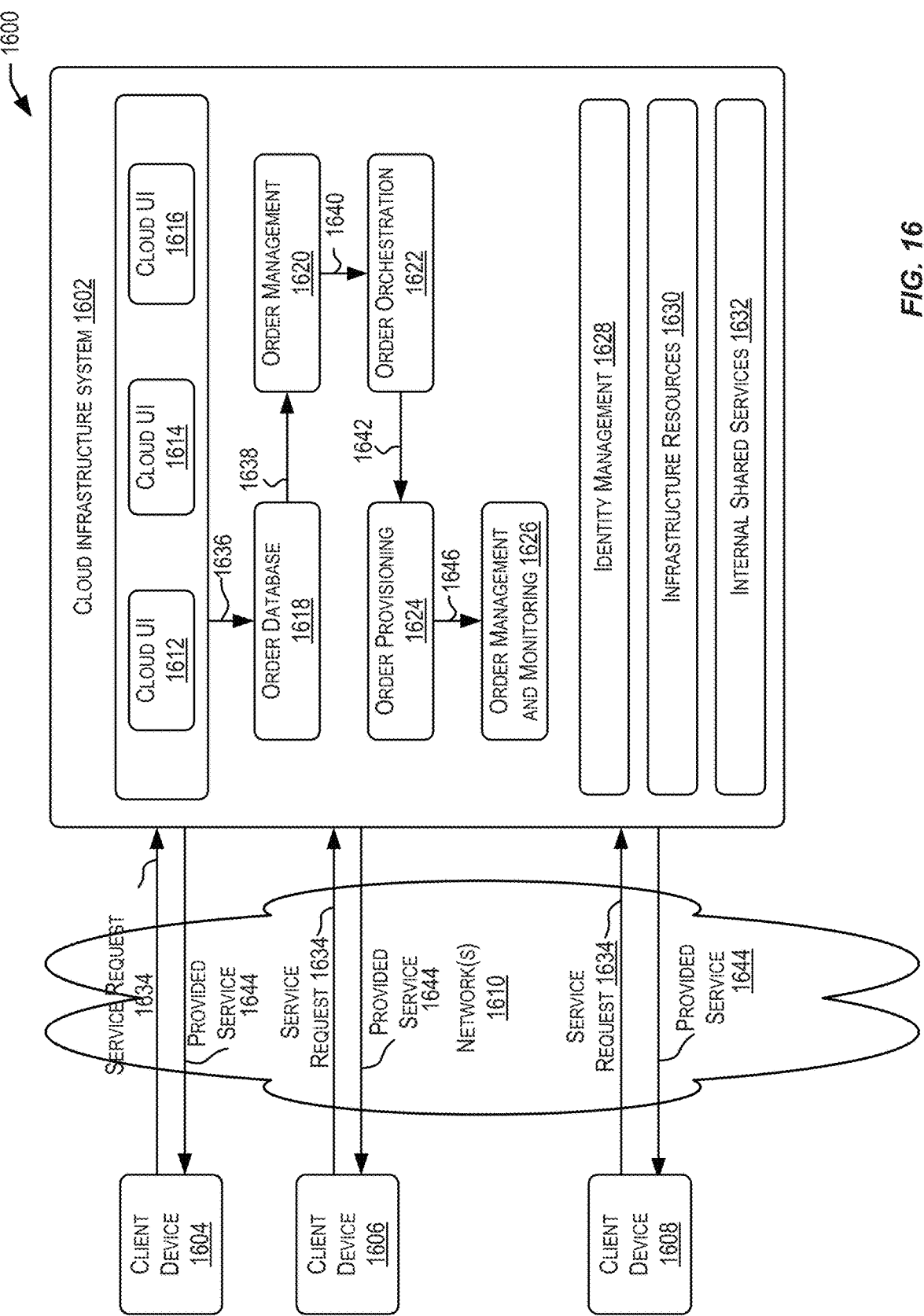
FIG. 16 illustrates a simplified block diagram of one or more components of a system environment in which services may be offered as cloud services, in accordance with some example embodiments.
Figure 17:
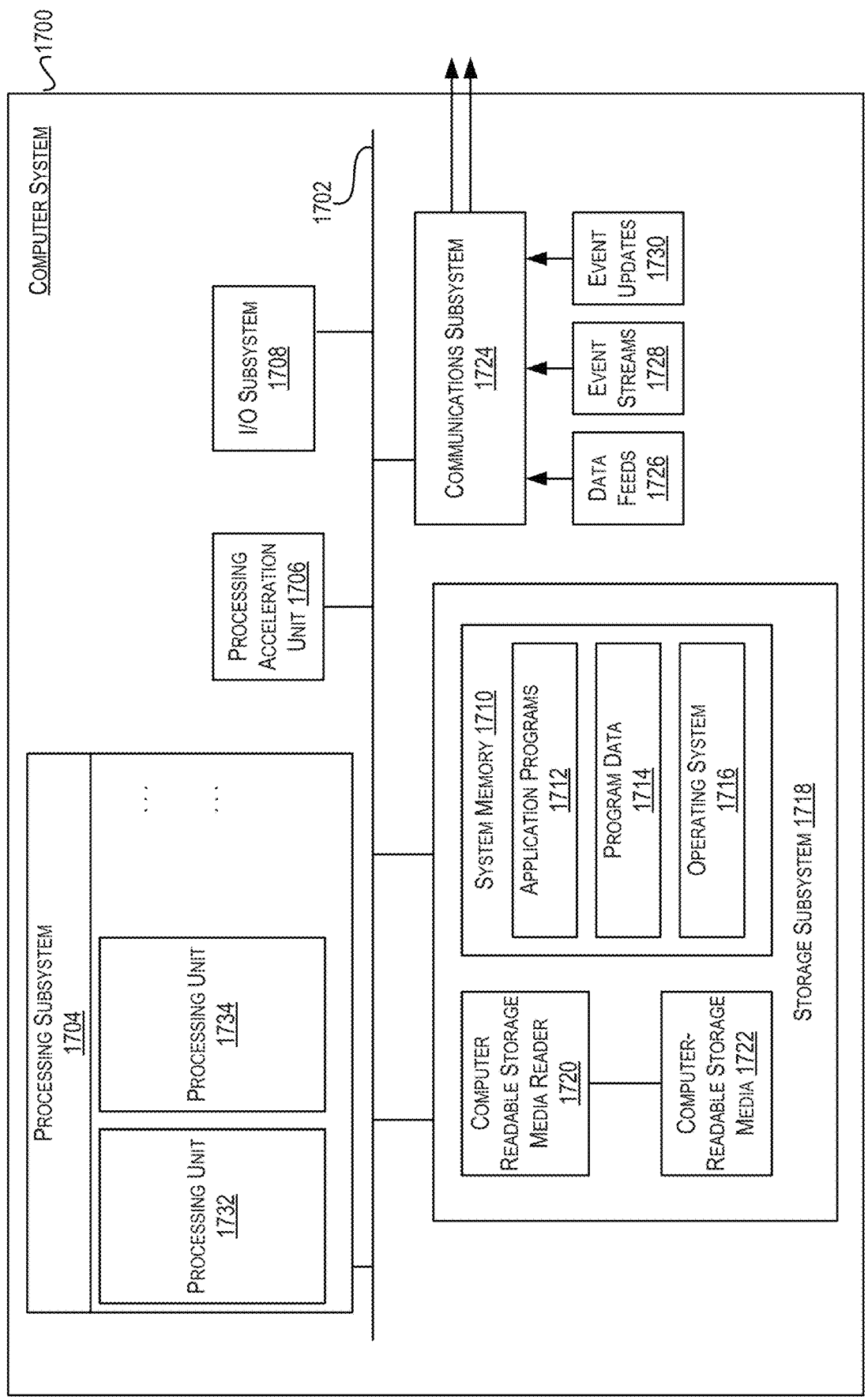
FIG. 17 illustrates an exemplary computer system that may be used to implement certain components, in accordance with some example embodiments.

FIGS. 15, 16, and 17 illustrate exemplary hardware and/or software configurations used in various embodiments.

FIG. 15 illustrates a simplified diagram of a distributed system for implementing some example embodiments. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications such as services and applications that provide code and/or data for performing efficient application configuration patching for applications executing at the server 1512 or another server. In certain embodiments, server 1512 may also provide other services or software applications that can include non-virtual and virtual environments. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in FIG. 15, software components 1518, 1520 and 1522 of system 1500 are shown as being implemented on server 1512. As one example, one or more of the components (e.g., software component 1518) may be the configuration patch module or binary patch module discussed throughout the application.

In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in FIG. 15 is thus one example of a distributed system for implementing an embodiment system and is not intended to be limiting.

Client computing devices 1502, 1504, 1506, and/or 1508 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1510.

Although distributed system 1500 in FIG. 15 is shown with four client computing devices, any number of client computing devices may be supported. Other devices, such as devices with sensors, etc., may interact with server 1512.

Communication network(s) 1510 in distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1512 can include one or more virtual machines running virtual operating systems, or other computing architectures involving virtualization. One or more flexible pools of logical storage devices can be virtualized to maintain virtual storage devices for the server. Virtual networks can be controlled by server 1512 using software defined networking. In various embodiments, server 1512 may be adapted to run one or more services or software applications described in the foregoing disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1500 may also include one or more databases 1514 and 1516. These databases may provide a mechanism for storing information such as user interactions information, usage patterns information, adaptation rules information, and other information used by example embodiments. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle, that are adapted to store, update, and retrieve data in response to SQL-formatted commands. However, databases 1514 and 1516 may provide relational databases, object-oriented databases, object-relational databases, NoSQL databases, etc., and may or may not be SQL-based. For example, databases 1514 and/or 1516 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 16 is a simplified block diagram of one or more components of a system environment 1600 in which services may be offered as cloud services, in accordance with some embodiments of the present disclosure. In the illustrated embodiment in FIG. 16, system environment 1600 includes one or more client computing devices 1604, 1606, and 1608 that may be used by users to interact with a cloud infrastructure system 1602 that provides cloud services. Additionally, in some embodiments the "client" computing devices 1604, 1606, 1608 may actually be server computers acting as a client in a client-server relationship, where the server may provide application configuration patching services. Cloud infrastructure system 1602 may comprise one or more computers and/or servers that may include those described above for server 1512.

It should be appreciated that cloud infrastructure system 1602 depicted in FIG. 16 may have other components than those depicted. Further, the embodiment shown in FIG. 16 is one example of a cloud infrastructure system that may incorporate an example embodiment. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for 1502, 1504, 1506, and 1508. Client computing devices 1604, 1606, and 1608 may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602. Although exemplary system environment 1600 is shown with three client computing devices, any number of client computing devices may be supported. Other devices such as devices with sensors, etc. may interact with cloud infrastructure system 1602.

Communication network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols, including those described above for communication network(s) 1610.

In certain embodiments, services provided by cloud infrastructure system 1602 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1602 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle Corporation) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform, and other resources.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 to enable provisioning of services by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1602, and the like.

In one embodiment, as depicted in FIG. 16, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In an exemplary operation, at 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI) such as cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

At 1636, the order information received from the customer may be stored in an order database 1618. If this is a new order, a new record may be created for the order. In one embodiment, order database 1618 can be one of several databases operated by cloud infrastructure system 1618 and operated in conjunction with other system elements.

At 1638, the order information may be forwarded to an order management module 1620 that may be configured to perform billing and accounting functions related to the order, such as verifying the order, and upon verification, booking the order.

At 1640, information regarding the order may be communicated to an order orchestration module 1622 that is configured to orchestrate the provisioning of services and resources for the order placed by the customer. In some instances, order orchestration module 1622 may use the services of order provisioning module 1624 for the provisioning. In certain embodiments, order orchestration module 1622 enables the management of business processes associated with each order and applies business logic to determine whether an order should proceed to provisioning.

As shown in the embodiment depicted in FIG. 16, at 1642, upon receiving an order for a new subscription, order orchestration module 1622 sends a request to order provisioning module 1624 to allocate resources and configure resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. This enables order orchestration module 1622 to be isolated from implementation details, such as whether or not services and resources are actually provisioned on the fly or pre-provisioned and allocated/assigned upon request.

At 1644, once the services and resources are provisioned, a notification may be sent to the subscribing customers indicating that the requested service is now ready for use. In some instance, information (e.g. a link) may be sent to the customer that enables the customer to start using the requested services.

At 1646, a customer's subscription order may be managed and tracked by an order management and monitoring module 1626. In some instances, order management and monitoring module 1626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1600 may include an identity management module 1628 that is configured to provide identity services, such as access management and authorization services in cloud infrastructure system 900. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

FIG. 17 illustrates an exemplary computer system 1700 that may be used to implement certain components according to some example embodiments. In some embodiments, computer system 1700 may be used to implement any of the various servers and computer systems described above. As shown in FIG. 17, computer system 1700 includes various subsystems including a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 may include tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processing units 1732, 1734, etc. A processing unit may include be one or more processors, including single core or multicore processors, one or more cores of processors, or combinations thereof. In some embodiments, processing subsystem 1704 can include one or more special purpose co-processors such as graphics processors (GPUs), digital signal processors (DSPs), or the like. In some embodiments, some or all of the processing units of processing subsystem 1704 can be implemented using customized circuits, such as application specific integrated circuits (ASICs), or field programmable gate arrays (FPGAs).

In some embodiments, the processing units in processing subsystem 1704 can execute instructions stored in system memory 1710 or on computer readable storage media 1722. In various embodiments, the processing units can execute a variety of programs or code instructions and can maintain multiple concurrently executing programs or processes. At any given time, some or all of the program code to be executed can be resident in system memory 1710 and/or on computer-readable storage media 1722 including potentially on one or more storage devices. Through suitable programming, processing subsystem 1704 can provide various functionalities described above for performing efficient application configuration patching operations.

In certain embodiments, a processing acceleration unit 1706 may be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term "input device" is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1718 provides a repository or data store for storing information that is used by computer system 1700. Storage subsystem 1718 provides a tangible non-transitory computer-readable storage medium for storing the basic programming and data constructs that provide the functionality of some embodiments. Software (programs, code modules, instructions) that when executed by processing subsystem 1704 provide the functionality described above may be stored in storage subsystem 1718. The software may be executed by one or more processing units of processing subsystem 1704. Storage subsystem 1718 may also provide a repository for storing data used in accordance with the some example embodiments.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM) or dynamic random access memory (DRAM).

By way of example, and not limitation, as depicted in FIG. 17, system memory 1710 may store application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1722 may store programming and data constructs that provide the functionality of some embodiments. Software (programs, code modules, instructions) that when executed by processing subsystem 1704 a processor provide the functionality described above may be stored in storage subsystem 1718. By way of example, computer-readable storage media 1722 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1722 may provide storage of computer-readable instructions, data structures, program modules, and other data for computer system 1700.

In certain embodiments, storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for storing computer-readable information.

In certain embodiments, computer system 1700 may provide support for executing one or more virtual machines. Computer system 1700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1700. Accordingly, multiple operating systems may potentially be run concurrently by computer system 1700. Each virtual machine generally runs independently of the other virtual machines.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client devices via the Internet for receiving and sending information from and to the client devices.

Communication subsystem 1724 may support both wired and/or wireless communication protocols. For example, in certain embodiments, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

Communication subsystem 1724 can receive and transmit data in various forms. For example, in some embodiments, communications subsystem 1724 may receive input communication in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method performed by an adaptive recommendation system, the method comprising:
    ingesting a first data set comprising a first column of data, wherein the first data set is a spreadsheet comprising a plurality of columns of data;
    profiling the first column of data in the first data set by collecting a first column level signature for the first column of data in the first data set, wherein the first column level signature comprises metadata describing the data in the first column of data;
    recommending one or more actions to be performed on the first column of data in the first data set based on the first column level signature of the first column of data in the first data set in order to enrich the first column of data;
    receiving one or more actions performed by a user on the first column of data;
    storing the one or more actions performed by the user on the first column of data in a history store;
    ingesting a second data set comprising a second column of data;

profiling the second column of data in the second data set by collecting column level signatures for the second column of data in the second data set;

determining column similarity between the first column of data in the first data set and the second column of data in the second data set;

in response to determining that the first column of data in the first data set and the second column of data in the second data set are similar, identifying one or more actions performed by the user on the first column of data from data stored in the history store;

recommending the one or more actions performed on the first column of data to the user;

receiving one or more actions performed by the user on the second column of data; and storing the one or more actions performed by the user on the second column of data in the history store.

2. The method according to claim 1, wherein the one or more actions performed by the user comprises an action from a group consisting of a recommended action and a manual action input by the user.

3. The method according to claim 1, wherein the second data set is a spreadsheet comprising a second of columns of data.

4. The method according to claim 1, wherein the metadata describing the data in the first column of data comprises at least one from a group consisting of metrics information metadata, data type information metadata, and semantic type information metadata.

5. The method according to claim 1, wherein enriching the first column of data comprises enhancing the first column of data in accordance with specifications of the user.

6. The method according to claim 1, wherein enriching the first column of data comprises correcting typographical errors the column of data.

7. The method according to claim 1, wherein enriching the first column of data comprises providing additional information corresponding to a type of information in the column of data.

8. The method according to 8, wherein in response to the type of information in the first column of data being city information, enriching the first column of data to comprise at least one from a group consisting of latitude information, longitude information, and demographic information.

9. The method according to claim 1, wherein the history store comprises a metadata history store configured to store column level signatures for columns of data in the first data set and one or more actions that are performed on the column of data in the first data set.

10. The method according to claim 1, wherein determining column similarity between the first column of data in the first data set and the second column of data in the second data set comprises calculating a similarity score.

11. The method according to claim 1, further comprising:
ingesting a third data set comprising a third column of data;

profiling the third column of data in the third data set by collecting column level signatures for the third column of data in the third data set;

determining column similarity between the third column of data in the third data set and one of the first column of data in the first data set and the second column of data in the second data set;

in response to determining that the third column of data in the third data set and one of the first column of data in the first data set and the second column of data in the second data set are similar, identifying one or more actions performed by the user on the one of the first column of data in the first data set and the second column of data in the second data set that is similar to the third column of data in the third data set;

recommending the one or more actions performed on the one of the first column of data in the first data set and the second column of data in the second data set that is similar to the third column of data in the third data set;

receiving one or more actions performed by the user on the third column of data; and storing the one or more actions performed by the user on the third column of data in the history store.

12. A non-transitory computer readable medium storing a plurality of instructions which, when executed by a processor, causes the processor to perform a method comprising:
ingesting a first data set comprising a first column of data, wherein the first data set is a spreadsheet comprising a plurality of columns of data;

profiling the first column of data in the first data set by collecting a first column level signature for the first column of data in the first data set, wherein the first column level signature comprises metadata describing the data in the first column of data;

recommending one or more actions to be performed on the first column of data in the first data set based on the first column level signature of the first column of data in the first data set in order to enrich the first column of data;

receiving one or more actions performed by a user on the first column of data;

storing the one or more actions performed by the user on the first column of data in a history store;

ingesting a second data set comprising a second column of data;

profiling the second column of data in the second data set by collecting column level signatures for the second column of data in the second data set;

determining column similarity between the first column of data in the first data set and the second column of data in the second data set;

in response to determining that the first column of data in the first data set and the second column of data in the second data set are similar, identifying one or more actions performed by the user on the first column of data from data stored in the history store;

recommending the one or more actions performed on the first column of data to the user;

receiving one or more actions performed by the user on the second column of data; and storing the one or more actions performed by the user on the second column of data in the history store.

13. The computer readable medium according to claim 12, wherein the one or more actions performed by the user comprises an action from a group consisting of a recommended action and a manual action input by the user.

14. The computer readable medium according to claim 12, wherein the second data set is a spreadsheet comprising a second plurality of columns of data.

15. The computer readable medium according to claim 12, wherein the metadata describing the data in the first column of data comprises at least one from a group consisting of metrics information metadata, data type information metadata, and semantic type information metadata.

16. A system comprising:
a memory; and
a processor coupled to the memory, wherein the processor performs a method comprising:

ingesting a first data set comprising a first column of data, wherein the first data set is a spreadsheet comprising a plurality of columns of data;

profiling the first column of data in the first data set by collecting a first column level signature for the first column of data in the first data set, wherein the first column level signature comprises metadata describing the data in the first column of data;

recommending one or more actions to be performed on the first column of data in the first data set based on the first column level signature of the first column of data in the first data set in order to enrich the first column of data;

receiving one or more actions performed by a user on the first column of data;

storing the one or more actions performed by the user on the first column of data in a history store;

ingesting a second data set comprising a second column of data;

profiling the second column of data in the second data set by collecting column level signatures for the second column of data in the second data set;

determining column similarity between the first column of data in the first data set and the second column of data in the second data set;

in response to determining that the first column of data in the first data set and the second column of data in the second data set are similar, identifying one or more actions performed by the user on the first column of data from data stored in the history store;

recommending the one or more actions performed on the first column of data to the user;

receiving one or more actions performed by the user on the second column of data; and storing the one or more actions performed by the user on the second column of data in the history store.

17. The system according to claim 16, wherein the one or more actions performed by the user comprises an action from a group consisting of a recommended action and a manual action input by the user.

18. The system according to claim 16, wherein the second data set is a spreadsheet comprising a second plurality of columns of data.

19. The system according to claim 16, wherein the metadata describing the data in the first column of data comprises at least one from a group consisting of metrics information metadata, data type information metadata, and semantic type information metadata.

* * * * *

UNITED STATES PATENT AND TRADEMARK OFFICE
CERTIFICATE OF CORRECTION

PATENT NO. : 10,936,599 B2
APPLICATION NO. : 16/141356
DATED : March 2, 2021
INVENTOR(S) : Murray et al.

Page 1 of 2

It is certified that error appears in the above-identified patent and that said Letters Patent is hereby corrected as shown below:

On the Title Page

On page 2, Column 2, under Other Publications, Line 4, delete "Xploiting" and insert -- Exploiting --, therefor.

On page 2, Column 2, under Other Publications, Line 8, delete "HadoopMap Reduce" and insert -- Hadoop MapReduce --, therefor.

On page 2, Column 2, under Other Publications, Line 29, delete "(Cioudera)" and insert -- (Cloudera) --, therefor.

On page 2, Column 2, under Other Publications, Line 29, delete "(Cioudera)," and insert -- (Cloudera), --, therefor.

On page 3, Column 1, under Other Publications, Line 29, delete "Efficeint" and insert -- Efficient --, therefor.

On page 3, Column 1, under Other Publications, Line 57, delete "Phytoiiogist," and insert -- Phytologist, --, therefor.

In the Drawings

On sheet 15 of 18, in FIG. 14, under Reference Numeral 1438, Line 2, delete "Data5Source" and insert -- Data Source --, therefor.

In the Specification

In Column 2, Line 36, delete "that that" and insert -- that --, therefor.

In Column 7, Line 18, delete "than" and insert -- then --, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*

In Column 7, Line 39, after "to" delete "a".

In Column 9, Line 26, delete "including" and insert -- include --, therefor.

In Column 9, Line 49, delete "recommended" and insert -- recommend --, therefor.

In Column 18, Line 59, delete "that that" and insert -- that --, therefor.

In Column 22, Lines 49-50, delete "hexidecimal" and insert -- hexadecimal --, therefor.

In Column 26, Line 14, delete "identified)" and insert -- identified). --, therefor.

In Column 28, Lines 14-24, delete "For example, a data analysis tool such as Word2Vec can be used to identify semantically similar words to those included in the input data set from a knowledge source, such as a text corpus from a news aggregation service. In some embodiments, knowledge service 1410 can implement trigram modeling to preprocess data obtained from a knowledge source 1440 (such as YAGO) to generate an indexed table of words by category. Knowledge service 1410 can then create trigrams for each word in the augmented data set and match the word to a word from the indexed knowledge source 1440." and insert the same on Column 28, Line 13 as a continuation of the same paragraph.

In the Claims

In Column 43, Line 23, in Claim 3, after "second" insert -- plurality --.

In Column 43, Line 35, in Claim 6, after "errors" insert -- in --.

In Column 43, Line 40, in Claim 8, after "to" insert -- claim --.